(12) United States Patent
Sato et al.

(10) Patent No.: US 7,682,443 B2
(45) Date of Patent: Mar. 23, 2010

(54) ORGANIC-PIGMENT AQUEOUS DISPERSION, METHOD OF PRODUCING THE SAME, AND COLORED COATING COMPOSITION AND COATED ARTICLE USING THE SAME

(75) Inventors: Tadahisa Sato, Kanagawa (JP); Hideki Maeta, Kanagawa (JP); Jun Tanabe, Kanagawa (JP); Hirokazu Kyota, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/081,206

(22) Filed: Apr. 11, 2008

(65) Prior Publication Data
US 2008/0264300 A1 Oct. 30, 2008

(30) Foreign Application Priority Data
Apr. 11, 2007 (JP) ............................ 2007-103981

(51) Int. Cl.
*C08K 5/00* (2006.01)
(52) U.S. Cl. .................. 106/493; 106/412; 106/494; 106/495; 106/496; 106/497; 427/447; 427/465; 427/525; 427/255.14; 427/384; 428/835.6; 428/624; 428/847; 428/842.2; 428/843
(58) Field of Classification Search .................. None
See application file for complete search history.

(56) References Cited

U.S. PATENT DOCUMENTS

| 6,537,364 B2 * | 3/2003 | Dietz et al. ................. 106/493 |
| 2005/0109240 A1 * | 5/2005 | Maeta et al. ................ 106/493 |

FOREIGN PATENT DOCUMENTS

| JP | 2-38267 B2 | 8/1990 |
| JP | 5-178623 A | 7/1993 |
| JP | 07-018009 | * 1/1995 |
| JP | 2001-207115 A | 7/2001 |
| JP | 2001-270742 | * 10/2001 |
| JP | 2003-26972 A | 1/2003 |
| JP | 2003-113341 A | 4/2003 |
| JP | 2003-128955 A | 5/2003 |
| JP | 2004-43776 A | 2/2004 |
| JP | 2005-307154 A | 11/2005 |
| JP | 2006-104448 A | 4/2006 |
| JP | 2007-39643 A | 2/2007 |
| WO | WO 97/47396 A1 | 12/1997 |

* cited by examiner

*Primary Examiner*—Melvin C Mayes
*Assistant Examiner*—Smita Patel
(74) *Attorney, Agent, or Firm*—Buchanan Ingersoll & Rooney PC

(57) ABSTRACT

An organic-pigment aqueous dispersion, containing a pigment at a concentration of 6 to 30 mass %, and having a haze of 0.3 to 10%, as determined by enclosing the dispersion in a transparent glass cell of optical distance 0.2 mm and analyzing with integrating-sphere photoelectric photometry; and a colored coating composition using the same.

14 Claims, 2 Drawing Sheets

ORGANIC-PIGMENT AQUEOUS DISPERSION, METHOD OF PRODUCING THE SAME, AND COLORED COATING COMPOSITION AND COATED ARTICLE USING THE SAME

FIELD OF THE INVENTION

The present invention relates to an organic-pigment aqueous dispersion high in transparency and a method of producing the same, and to a colored coating composition and a coated article using the same. Specifically, the present invention relates to an organic-pigment aqueous dispersion that is capable of giving a colored film low in haze and high in transparency when made into a film, a method of producing the same, and a colored coating composition and a coated article produced by using the same. Further, the present invention relates to a highly transparent colored coating composition containing an organic pigment, and to a coated article, each of which can be used in coloring of materials or parts (glass, plastic, glossy-surfaced metal plates, etc.) for use, for example, in electronics, construction, advertising display (signboard, poster, etc.), illumination (electric lamp, fluorescent lamp, etc.), vehicle, and mirror.

BACKGROUND OF THE INVENTION

Paints to give metallic (brilliant) coated films have been used in coating in a volume of ratios for automobile exterior plates and parts thereof (e.g., door mirror, wheel cover, and front grille) and motorcycles, and also recently for OA devices, such as personal computer and word processor, cell phones, and home appliances, such as cabinet. Such a paint should form a colored metallic film classy in appearance and different in color, and metallic basecoat paints containing a scale brilliant pigment (such as aluminum pigment or mica pigment) have been developed. The metallic coated film obtained by using the above paint appears brilliant by reflection of external incident light by the brilliant pigment contained in the coated film, and the coated films in various colors provide characteristic decorative appearance rich in variety.

As a method of forming a metallic coated film, JP-B-2-38267 ("JP-B" means examined Japanese patent publication) discloses, for example, a metallic painting method of forming a metallic base film containing a relatively deep-colored pigment, and further forming thereon a colored clear coated film containing, at a low concentration, a high-chroma pigment similar in color to the relatively deep colored pigment. Further, WO97/47396 discloses a method of forming a metallic coated film, by sequentially applying a metallic base paint, a second base paint having transparency, and a clear paint.

However, in the method described in JP-B-2-38267, the relatively deep colored pigment contained in the metallic base film deteriorates metallic appearance, and thus, the resultant metallic coated film is not satisfactory in color depth and high color saturation. Further, in the method described in WO97/47396, the color of the coated film varies largely, due to slight change in coated film thickness of the second base paint having transparency, making it difficult to control the painting line and consequently, thus being apt to lead so-called framing phenomena, such as increase in film thickness and darkening of color in the edge regions.

It is possible to improve the above-mentioned phenomena drastically, by using a highly transparent dye as a colorant (a material for coloring the paint). However, the kinds of dyes usable in the paint, such as chelate dye (metal-containing dye) containing heavy metals such as chromium, are limited, from the viewpoint of weather resistance. Further, the metal-containing dyes are still lower in weather resistance than pigments, and the heavy metals such as chromium contained are environmentally hazardous, and thus, there exists a need for development of a novel colorant high in transparency. If such a colorant can be prepared with a pigment, it likely satisfies the requirements above. Thus, for providing a colorant which satisfies the aforementioned requirements, it is essential to produce a stable pigment dispersion high in transparency and resistant to aggregation even at higher concentration.

For preparation of a transparent pigment dispersion, it is necessary to produce a dispersion of pigment fine-particles small in average particle diameter and narrow in particle size distribution. Proposed for production of such a dispersion is a build-up method of producing particles chemically, but not a breakdown method of producing particles by pulverization of pigment. One of the methods is a production method of producing stable fine-particles, by precipitating an organic pigment by bringing a solution in which the organic pigment has been dissolved into contact gradually with an aqueous medium, in which a dispersant is added to one of the liquids (see JP-A-2003-26972 ("JP-A" means unexamined published Japanese patent application), JP-A-2003-113341, JP-A-2003-128955, and JP-A-2004-43776). Further, methods of performing the operation in a microreactor are also disclosed (see JP-A-2005-307154 and JP-A-2006-104448). Further, recently disclosed is a method of producing an organic pigment dispersion improved in the dispersion stability, by precipitating pigment fine-particles in the presence of a polymerizable compound, and then polymerizing the polymerizable compound (see JP-A-2007-39643).

However, the pigment concentration of the conventional pigment fine-particle dispersions is low, and increase in that concentration causes problems such as drastic increase in viscosity and deterioration in transparency.

Generally, glass products are often used as colored, for example, in applications, such as color filter for liquid crystal display devices, colored glass bottle, and others. One of the methods of obtaining a colored glass product, such as color filter or colored bottle, is a so-called sol-gel process of blending an organic colorant (e.g., dye or pigment) with silica sol, applying the resultant mixture on a glass surface, and baking the film for gelling. Generally, in the sol-gel process, a dense colored film cannot be obtained without heat treatment at high temperature. Use of a dye as the organic colorant often gives a colored film favorably transparent with low haze. However, dyes are often decomposed at high temperature, and thus, it is not possible to raise the baking temperature, which leads to deterioration in film density.

To overcome the problem, disclosed is a method of forming a color filter, by mixing organic pigment fine-particles having a small particle size, for example, of 3 nm to 300 nm with a metal alkoxide by use of a dispersant, applying the resultant mixture on a glass surface, and baking the coated film (see JP-A-5-178623). However, it is difficult to obtain fine particles having a uniform particle diameter by conventional breakdown methods based on mill dispersion, and, even if possible, such a method demands a vast amount of labor. In particular, it is quite difficult to obtain uniform fine particles having a particle diameter of 100 nm or less, which is essential for transparency.

To improve that point, disclosed is a method of using a solution containing a metal alkoxide and/or a metal-alkoxide hydrolytic condensate and a latent pigment (see JP-A-2001-207115). The colored film obtained by the method is more transparent than those obtained by conventional methods. However, it is a method of generating a pigment by high-temperature pyrolysis after coating, and thus, an unevenly colored film is often formed when a film of large area is prepared, due to irregularity of temperature distribution. Generally, gases such as carbon dioxide are generated, and for that reason, improvement in film density is still needed.

As described above, it is difficult to obtain a highly transparent colored film containing a dispersed pigment, and the same is true when a colored glass or a colored glossy-surfaced metal plate is prepared. Thus, there is a need for development of a colored coating composition that gives a colored film excellent in uniformity and transparency, that has desired film physical properties, and that can be used in various application uses.

SUMMARY OF THE INVENTION

The present invention resides in an organic-pigment aqueous dispersion, which comprises a pigment at a concentration of 6 to 30 mass %, and has a haze of 0.3 to 10%, as determined by enclosing the dispersion in a transparent glass cell of optical distance 0.2 mm and analyzing with integrating-sphere photoelectric photometry.

Further, the present invention resides in a method of producing an organic-pigment aqueous dispersion, which comprises: diluting the above-mentioned organic-pigment aqueous dispersion, to a pigment concentration of lower than 10 mass %.

Further, the present invention resides in a colored coating composition, which comprises the aqueous organic pigment fine-particle dispersion as a coloring component, and comprises at least one inorganic oxide as a matrix component.

Further, the present invention resides in a coated article, which is prepared with the organic-pigment aqueous dispersion.

Other and further features and advantages of the invention will appear more fully from the following description, appropriately referring to the accompanying drawings.

BRIEF DESCRIPTION OF THE DRAWINGS

FIG. 2-1 is an explanatory view of one embodiment of a reactor that can be used in the present invention, which reactor has a Y-shaped channel on one side.

FIG. 2-2 is a sectional view taken on line I-I of FIG. 2-1.

DETAILED DESCRIPTION OF THE INVENTION

Figure 1:
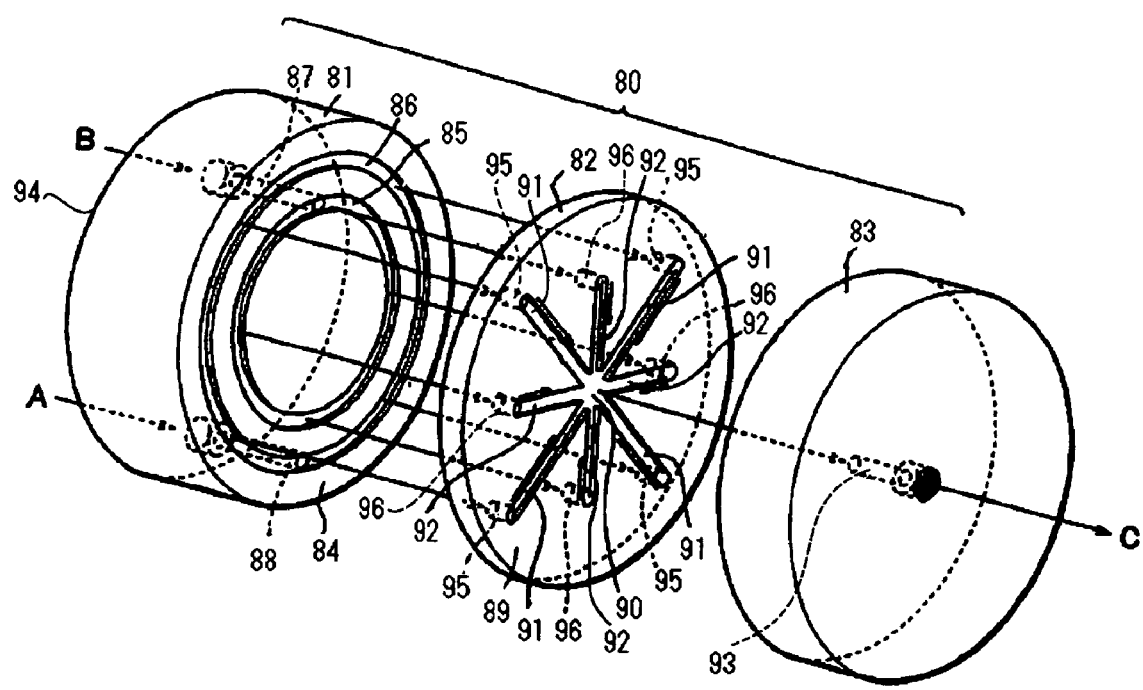
FIG. 1 is an exploded perspective view showing an exploded state of one embodiment of a three-dimensional micro-reactor that can be used in the present invention.

It is possible to obtain pigment fine-particles small in particle diameter at a low concentration, according to the methods described in JP-A-2003-26972, JP-A-2003-113341, JP-A-2003-128955, JP-A-2004-43776, JP-A-2005-307154, and JP-A-2006-104448. However, according to the studies by the inventors, even if a highly transparent dispersion at a high concentration is obtained, those methods require quite tedious and complicated operations, and it is difficult to prepare a transparent dispersion at a desired concentration cost-effectively in large quantity with the particles produced by those methods, and thus, those methods are unpractical. For example, in the method described in JP-A-2003-128955, after preparation of a pigment dispersion, the pigment particles contained therein are allowed to aggregate; the resultant dispersion is filtered through a membrane filter; and the paste-like dispersion thus obtained is redispersed in alkaline water. Further, the method requires an additional step of filtering the thus-obtained dispersion through a membrane filter, for removal of bulky particles, to give a filtrate. Such a pigment particle dispersion obtained after the tedious operations is still low in dispersion stability when concentrated to a desirable concentration and also in stability at higher concentration, and thus, it is difficult to obtain a transparent organic pigment dispersion at high concentration without aggregation of pigment fine-particles.

After intensive studies to solve the problems above, the inventors of the present invention have found that it is possible to obtain a pigment aqueous dispersion highly transparent even after concentration, by precipitating organic pigment fine-particles by the build-up method, in the presence of a particular surfactant. Further, we also found that it is possible to obtain a highly transparent colored coating composition, by mixing the pigment aqueous dispersion with an inorganic oxide. The present invention has been completed, based on the findings above.

According to the present invention, there is provided the following means:

(1) An organic-pigment aqueous dispersion, comprising a pigment at a concentration of 6 to 30 mass %, and having a haze of 0.3 to 10%, as determined by enclosing the dispersion in a transparent glass cell of optical distance 0.2 mm and analyzing with integrating-sphere photoelectric photometry.

(2) The organic-pigment aqueous dispersion described in (1), wherein a volume-average diameter (MV) of the organic pigment contained in the aqueous dispersion is 3 to 80 nm, and the ratio of volume-average diameter (MV)/number-average diameter (MN) is 1.2 to 1.80.

(3) The organic-pigment aqueous dispersion described in (1) or (2), wherein the aqueous dispersion contains at least one anionic surfactant that has a solubility of 5 mass % or more in an aprotic polar solvent.

(4) The organic-pigment aqueous dispersion described in (3), wherein the aprotic polar solvent is dimethylsulfoxide (DMSO).

(5) The organic-pigment aqueous dispersion described in any one of (1) to (4), wherein the aqueous dispersion contains at least one anionic surfactant that is represented by formula (I):

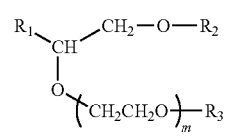

Formula (I)

wherein $R_1$ represents an alkyl group having 5 to 20 carbon atoms; $R_2$ represents an alkyl, alkenyl, or alkynyl group having 3 to 10 carbon atoms; $R_3$ represents —$SO_3M$ or —$(CH_2)_n$—COOM, in which M represents a sodium, potassium, or ammonium ion; and n is 1 or 2; and m is an integer of 1 to 20.

(6) The organic-pigment aqueous dispersion described in any one of (1) to (5), which is prepared by a pH-changing coprecipitation method.

(7) The organic-pigment aqueous dispersion described in (6), wherein the pH-changing coprecipitation method is carried out in the course of flow in a channel.

(8) The organic-pigment aqueous dispersion described in (7), wherein the channel in the pH-changing coprecipitation method is a micro space.

(9) The organic-pigment aqueous dispersion described in any one of (1) to (8), wherein a value, as determined by: forming a film with the aqueous dispersion by the following operations 1 to 4, and measuring a haze of the film with integrating-sphere photoelectric photometry, is 0.5 to 5%:
1. adjusting the organic-pigment aqueous dispersion with distilled water to a concentration of 5 mass %, to give a dispersion A;
2. adding polyvinyl alcohol (Kuraray Poval PVA205, trade name) to the dispersion A at a mass ratio of 10% to give a mixture thereof, and agitating the mixture thoroughly, to give a dispersion B;
3. applying the dispersion B on a transparent glass with a bar coater, to give a film of thickness 20±2 μm; and
4. drying the film at 50° C. for 3 hours.
(10) The organic-pigment aqueous dispersion described in any one of (1) to (9), wherein the dispersion is purified and concentrated with an ultrafiltration membrane.
(11) A method of producing an organic-pigment aqueous dispersion, comprising: diluting the organic-pigment aqueous dispersion according to any one of (1) to (10), to a pigment concentration of lower than 10 mass %.
(12) A colored coating composition, comprising the aqueous organic pigment fine-particle dispersion according to any one of (1) to (10) as a coloring component, and comprising at least one inorganic oxide as a matrix component.
(13) The colored coating composition according to (12), wherein, when a film of dry film thickness 300±10 nm is formed on a glass plate of thickness 1.0±0.1 mm by spin coating of the colored coating composition, a haze of the film is 0.03 to 0.1%.
(14) The colored coating composition according to (12) or (13), wherein the inorganic oxide is a metal alkoxide and/or a metal-alkoxide hydrolytic condensate.
(15) The colored coating composition according to any one of (12) to (14), wherein the colored coating composition contains a solvent which contains water as a major component.
(16) A coated article, which is prepared with the organic-pigment aqueous dispersion according to any one of (1) to (10).

Hereinafter, the present invention will be described in detail.

The organic pigment fine-particles contained in the aqueous dispersion of the present invention is preferably produced by a build-up method. The build-up method is a method of producing organic pigment fine-particles from an organic pigment or an organic pigment precursor dissolved (or made into a state of molecular dispersion) in a solvent, via chemical reaction. In the present invention, the pigment fine-particles prepared by the build-up method are referred to as "built-up organic pigment fine-particles".

In the present invention, a liquid-phase method is preferable among the build-up methods, and a coprecipitation method is more preferable. The coprecipitation method in the present invention means a method of precipitating a pigment by bringing a solution of the pigment dissolved (or made into a state of molecular dispersion) in a good solvent into contact with a poor solvent (for example, an aqueous medium) gradually, wherein the pigment fine-particles are precipitated in the presence of a dispersant. The liquid to which the dispersant is added in the coprecipitation method is not particularly limited, but the dispersant is preferably added to one or both of the pigment solution and the poor solvent, and, in this manner, it is possible to improve the dispersion stability effectively upon fine-particle precipitation. If no dispersant is used in the coprecipitation method, the fine-particle-forming method may be referred to particularly as "reprecipitation method" to distinguish it from the coprecipitation method.

In the present invention, when preparing built-up pigment fine-particles by the coprecipitation method, it is preferable to change the hydrogen ion index (pH) of the pigment solution, by bringing the pigment solution into contact with a poor solvent. In the present invention, the method will be referred to as "pH-changing coprecipitation method". When the pigment fine-particles are precipitated from an alkali-dissolved pigment, the hydrogen ion index (pH) is preferably lowered in the range of pH 16.0 to 5.0, more preferably in the range of pH 16.0 to 10.0. When the pigment fine-particles are precipitated from an acid-dissolved pigment, the hydrogen ion index (pH) is preferably increased in the range of pH 1.5 to 9.0, more preferably in the range of pH 1.5 to 4.0. The width of change varies according to the hydrogen ion index (pH) of the pigment solution, but is preferably sufficient for inducing precipitation of the pigment. Favorably as described above, it is possible to prepare stable pigment fine-particles by forming fine particles, by the chemical reaction of change of pH.

In the present invention, it is preferable to induce precipitation of the pigment fine-particles by bringing the pigment solution into contact with a poor solvent in the course of flow in a channel. Such contact in the course of flow allows precipitation of the pigment fine-particles, under a condition more uniform than that by a batch method of carrying out the reaction normally in a reactor vessel. It is more preferably carried out in the state of laminar flow or in the transient state between laminar flow and turbulent flow, particularly preferably in the state of laminar flow. The laminar and turbulent flows are explained respectively as follows. When causing water to flow into a pipe, inserting a narrow pipe into the pipe along the central axis thereof and then injecting a colored solution into the water, the colored solution flows in the form of a single line while the flow velocity of the water is small or slow. Thus, the water flows straightly and in parallel to the wall of the pipe. However, when the flow velocity is raised to reach a given flow velocity, turbulence is suddenly caused in the water flow. Consequently, the colored solution is mixed with the water flow so that the whole of the solution and water becomes a colored flow. The former flow is called laminar flow, and the latter flow is called turbulent flow. The intermediate flow between them is called the transient-state flow.

Whether a flow turns to a laminar flow or turbulent flow depends on whether or not the Reynolds number, which is a dimensionless number showing the state of the flow, is not more than a given critical value. As the Reynolds number is smaller, a laminar flow is more apt to be caused. The Reynolds number Re of the flow in a pipe is represented by the following equation:

$$Re = D \langle v_x \rangle \rho / \mu$$

wherein D represents the equivalent diameter of the pipe, $\langle v_x \rangle$ represents the sectional average velocity, $\rho$ represents the density of the flow, and $\mu$ represents the viscosity of the flow. As can be understood from this equation, the Reynolds number is smaller as the equivalent diameter is smaller. Therefore, in the case that the equivalent diameter is in the order of μm, a stable laminar flow is apt to be formed. Further, the physical properties of the liquid, such as the density and the viscosity thereof, also have influence on the Reynolds number. As the density is smaller and/or the viscosity is larger, the Reynolds number is smaller. It can be, therefore, understood that a laminar flow is apt to be formed in that case.

The critical value of Reynolds number when the flow changes is called a critical Reynolds number. The critical Reynolds number is not always constant but typically the following value (see Fumimaru Ogino Ed., "Chemical Engineering Handbook", p.37, 2004, Asakura Publishing Company Ltd.).

| | |
|---|---|
| Re < 2,300 | Laminar flow; |
| Re > 4,000 | Turbulent flow; and |
| 4000 ≧ Re ≧ 2,300 | Transient state (transitional region) |

For example, the flow in transient state includes Karman-vortex flow and Taylor-vortex flow including from the laminar vortex flow region to the turbulent flow region, and the like. The "non-laminar flow" including the Karman-vortex and Taylor-vortex flow will be described in detail below.

It is possible to prepare efficiently a pigment fine-particle dispersion small in particle size, narrow in its distribution, low in turbidity, and high in transparency, by forming particles (from nucleation to nucleus growth) in the course of flow in the laminar flow or transient state (Re<4000) and stabilizing the velocity of particle growth. Pigment fine-particles prepared in combination of the fine-particle precipitation in the course of flow and the fine-particle precipitation by pH change described above are particularly preferable, because they are excellent in particle size, its distribution, and dispersion stability, and also high in productivity. In particular, small turbidity of fine particles, which relates to narrow width in particle diameter distribution (which means to be excellent in monodispersity), leads to production of a stable dispersion high in transparency even at high concentration.

In the present invention, it is preferable to use a microreactor device to form the built-up pigment fine-particles. It is particularly preferable to use a microreactor device of confluent pattern called center collision, which allows readily adjustment of a flow in the range from laminar flow to transient-state flow. FIG. 1 is an exploded perspective view showing an example of a three-dimensional microreactor 80, under the condition that three parts constituting the microreactor 80 are decomposed. The three-dimensional microreactor 80 is mainly composed of a supply block 81, a combination block 82, and a reaction block 83, each having a cylindrical shape. For assembling the microreactor 80, the side faces of the blocks 81, 82, 83 having a cylindrical shape are attached to each other in this order to form a cylinder, and in this state, the respective blocks 81, 82, 83 are fastened integrally with bolts/nuts, etc.

On a side face 84 of the supply block 81 opposed to the combination block 82, two annular grooves 86, 85 are formed concentrically, and in the assembled state of the microreactor 80, two annular grooves 86, 85 form ring-shaped flow paths (channels) through which the solutions B and A flow respectively. Then, through-holes 88, 87 are respectively formed so as to reach the outside annular groove 86 and the inside annular groove 85 from a side face 94 of the supply block 81 not opposed to the combination block 82. Among two through-holes 88, 87, supply means (a pump, a connecting tube, etc.) for supplying the solution A is connected to the through-hole 88 communicated with the outside annular groove 86, and supply means (a pump, a connecting tube, etc.) for supplying the solution B is connected to the through-hole 87 communicated with the inside annular groove 85. In FIG. 1, although the solution A is allowed to flow through the outside annular groove 86, and the solution B is allowed to flow through the inside annular groove 85, they may be opposite.

At the center of a side face 89 of the combination block 82 opposed to the reaction block 83, a circular combination hole 90 is formed, and four long radial grooves 91, 91 . . . and four short radial grooves 92, 92 . . . are formed alternately in a radial manner from the combination hole 90. In the assembled state of the microreactor 80, the combination hole 90 and the radial grooves 91, 92 form a circular space to be a combination region 90 and radial flow paths through which the solutions A, B flow. Further, through-holes 95, 95 . . . are respectively formed in a thickness direction of the combination block 82 from the tip ends of the long radial grooves 91 among eight radial grooves 91, 92, and these through-holes 95 are communicated with the above-mentioned outside annular groove 86 formed in the supply block 81. Similarly, through-holes 96, 96 . . . are respective formed in a thickness direction of the combination block 82 from the tip ends of the short radial grooves 92, and the through-holes 96 are communicated with the inside annular groove 85 formed in the supply block 81.

Further, at the center of the reaction block 83, one through-hole 93 communicated with the combination hole 90 is formed in a thickness direction of the reaction block 83, and the through-hole 93 becomes a micro-flow path.

Because of this, the solution A flows through a supply flow path composed of the through-hole of the supply block 81, the outside annular groove 86, the through-holes 95 of the combination block 82, and the long radial grooves 91, and divided into four divided flows to reach the combination region (combination hole 90). On the other hand, the solution B flows through a supply flow path composed of the through-hole 87 of the supply block 81, the inside annular groove 85, the through-holes 96 of the combination block 82, and the short radial grooves 92, and divided into four divided flows to reach the combination region (combination hole 90). In the combination region, the divided flow of the solution A and the divided flow of the solution B are combined with having the respective kinetic energy, and thereafter, the resultant combined flow flows in the micro-flow path with the flow direction changed by 90°.

Figures 1, 2:
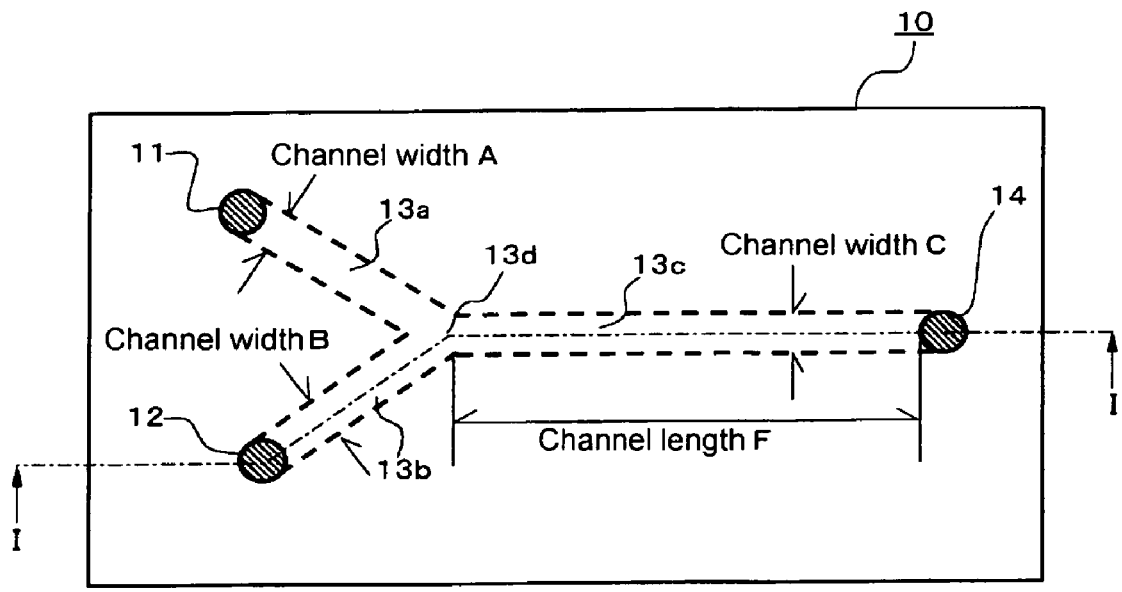
Figure 2:
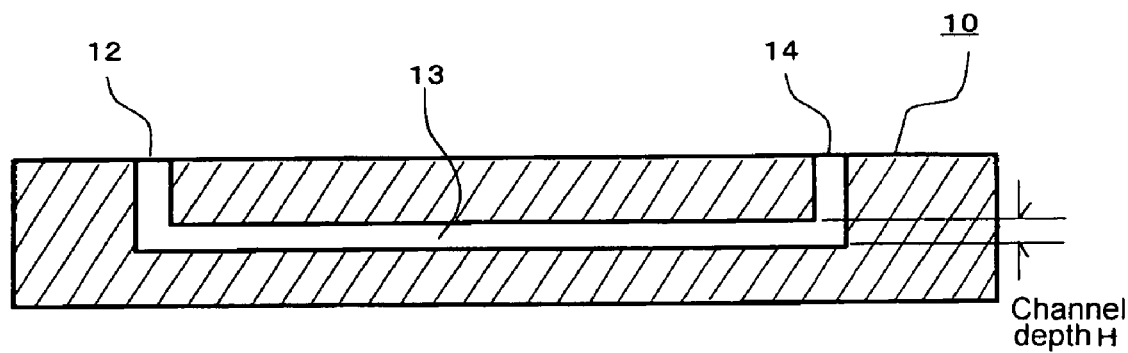

Alternatively, it is also preferable to use a reactor having a Y-shaped flow path (13), as shown in FIGS. 2-1 and 2-2. FIG. 2-1 is an illustrative view of such a reactor 10, and FIG. 2-2 is a sectional view along the I-I line in FIG. 2-1 above. In the device of the present embodiment, for example, two kinds of liquids are supplied to inlets 11 and 12 respectively. The cross-sectional shape of each channel in the direction perpendicular to the longitudinal direction may vary depending on the micro-processing technology to be used, but is preferably almost trapezoidal or rectangular. The liquids injected through the inlets 11 and 12, for example by pumping, flow respectively through an introductory channel 13a (channel width: X) and an introductory channel 13b (channel width: Y) to a fluid confluent point 13d, where the liquids are brought into contact with each other, to form a stable laminar flow, and then after confluence, the thus-formed flow flows into the mixing region of a reaction channel 13c (channel width: C, channel length: F, channel depth: H). For example, in the course of flow as laminar flow in a mixing region 13c (starting point: 13d, and end point: 14), the reaction takes place as the components in the flows are mixed by molecular diffusion at the interface of the laminar flow if in the laminar flow state. Then, a substance extremely less diffusive may not lead to diffusive mixing in the laminar flow and be mixed only after reaching the outlet port 14. When the two injected liquids are a combination readily mixing in a flask, extension of the channel length F in the mixing region may make the liquid flow uniformly at the outlet port. On the other hand, even in such a combination shortening of the channel length F allows the laminar flow kept until the outlet port.

Alternatively, use may be made of a reactor having a circular cylindrical channel, a device improved for separating two liquids when they reach the outlet in the laminar flow, or the like (see, e.g., JP-A-2005-307154, Paragraphs 0049 to 0052 and FIGS. 1 to 4). Yet alternatively, use may also be preferably made of a planar microreactor or three-dimensional microreactor, allowing adjustment of the contact angle of two liquids and the number of contact channels (see, e.g., JP-A-2006-342304, Paragraphs 0053 to 0056 and FIGS. 1 to 3).

The built-up pigment fine-particles according to the present invention may be formed by bringing the pigment solution into contact with a poor solvent under non-laminar flow. The "non-laminar flow" is flow containing regular or irregular movement, and includes, for example, from laminar vortex flow region, typical examples thereof including Karman- and Taylor-vortex flows, to turbulent flow region.

As described above, the non-laminar flow is flow including regular or irregular movement. More specifically, as described above, when a first viscous liquid (e.g., water) is supplied into a micro channel and another second viscous liquid (e.g., colored water) injected through a pipe thinner than the micro channel that is provided in the axial direction, if the flow velocity is sufficiently low, the colored water flows steadily as a single linear flow without movement, in parallel with the flow channel axis, i.e., in laminar flow. Gradual increase of the flow velocity leads to transition to unstable flow with movement, and finally to mixing of the second viscous liquid with the first viscous liquid in the turbulence caused by the movement. Thus, the laminar flow changes continuously to turbulent flow. Independently of whether in the laminar flow region or in the turbulent flow region, the movement of the flow above include both regular and irregular movement, and the non-laminar flow includes both of them.

For example, the flow including regular movement includes Karman vortex flow and Taylor vortex flow. On the other hand, the flow including irregular movement includes so-called the flow in the turbulent flow state, wherein irregular vortexes, large and small, are generated and removed repeatedly. With respect to the non-laminar flow, reference can be made, for example, of (1) "Chemical Engineering Handbook, revised 6th Ed.", Soc. of Chemical Engineers, Japan Ed., Maruzen Co., Ltd., (2) "Dictionary of Science and Chemistry", 5th Ed., Iwanami Shoten, (3) by M. Engler et al., "Effective Mixing by the Use of Convective Micro Mixers", Conference Proceedings, 2005 Spring National Meeting, AIChE, 128d, and it can be conducted according to the embodiments described, for example, in JP-A-2006-342304.

An organic pigment that can be used in the pigment aqueous dispersion of the present invention is not limited in the color tone thereof, and examples include a perylene, perynone, quinacridone, quinacridonequinone, anthraquinone, anthanthrone, benzimidazolone, condensed disazo, disazo, azo, indanthrone, quinophthalone, quinoxalinedione, metallic complex azo, phthalocyanine, triaryl carbonium, dioxazine, aminoanthraquinone, diketopyrrolopyrrole, naphthole AS, thioindigo, isoindoline, isoindolinone, pyranthrone or isoviolanthrone-compound pigment, or a mixture thereof.

More specifically, examples of the organic pigment include perylene-compound pigments, such as C.I. Pigment Red 179, C.I. Pigment Red 190, C.I. Pigment Red 224, and C.I. Pigment Violet 29; perynone-compound pigments, such as C.I. Pigment Orange 43, and C.I. Pigment Red 194; quinacridone-compound pigments, such as C.I. Pigment Violet 19, C.I. Pigment Violet 42, C.I. Pigment Red 122, C.I. Pigment Red 192, C.I. Pigment Red 202, C.I. Pigment Red 207, and C.I. Pigment Red 209; quinacridonequinone-compound pigments, such as C.I. Pigment Red 206, C.I. Pigment Orange 48, and C.I. Pigment Orange 49; anthraquinone-compound pigments, such as C.I. Pigment Yellow 147; anthanthrone-compound pigments, such as C.I. Pigment Red 168; benzimidazolone-compound pigments, such as C.I. Pigment Brown 25, C.I. Pigment Violet 32, C.I. Pigment Yellow 180, C.I. Pigment Yellow 181, C.I. Pigment Orange 36, C.I. Pigment Orange 62, and C.I. Pigment Red 185; condensed disazo-compound pigments, such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144 (C.I. No. 20735), C.I. Pigment Red 166, C.I. Pigment Yellow 219, C.I. Pigment Red 220, C.I. Pigment Red 221, C.I. Pigment Red 242, C.I. Pigment Red 248, C.I. Pigment Red 262, and C.I. Pigment Brown 23; disazo-compound pigments, such as C.I. Pigment Yellow 13, C.I. Pigment Yellow 83, and C.I. Pigment Yellow 188; azo-compound pigments, such as C.I. Pigment Red 187, C.I. Pigment Red 170, C.I. Pigment Yellow 74, C.I. Pigment Red 48, C.I. Pigment Red 53, C.I. Pigment Orange 64, and C.I. Pigment Red 247; indanthrone-compound pigments, such as C.I. Pigment Blue 60; indanthrene-compound pigments, such as C.I. Pigment Blue 60; quinophthalone-compound pigments, such as C.I. Pigment Yellow 138; quinoxalinedione-compound pigments, such as C.I. Pigment Yellow 213; metallic complex azo-compound pigments, such as C.I. Pigment Yellow 129, and C.I. Pigment Yellow 150; phthalocyanine-compound pigments, such as C.I. Pigment Green 7, C.I. Pigment Green 36, C.I. Pigment Green 37, C.I. Pigment Blue 16, C.I. Pigment Blue 75, and C.I. Pigment Blue 15 (including 15:1, 15:6, others); triaryl carbonium-compound pigments, such as C.I. Pigment Blue 56, and C.I. Pigment Blue 61; dioxazine-compound pigments, such as C.I. Pigment Violet 23, and C.I. Pigment Violet 37; aminoanthraquinone-compound pigments, such as C.I. Pigment Red 177; diketopyrrolopyrrole-compound pigments, such as C.I. Pigment Red 254, C.I. Pigment Red 255, C.I. Pigment Red 264, C.I. Pigment Red 272, C.I. Pigment Orange 71, and C.I. Pigment Orange 73; naphthole AS-compound pigments, such as C.I. Pigment Red 187, and C.I. Pigment Red 170; thioindigo-compound pigments, such as C.I. Pigment Red 88; isoindoline-compound pigments, such as C.I. Pigment Yellow 139, C.I. Pigment Orange 66; isoindolinone-compound pigments, such as C.I. Pigment Yellow 109, C.I. Pigment Yellow 110, and C.I. Pigment Orange 61; pyranthrone-compound pigments, such as C.I. Pigment Orange 40, and C.I. Pigment Red 216; and isoviolanthrone-compound pigments, such as C.I. Pigment Violet 31.

Preferable organic pigments include anthraquinone, naphthol, perylene, quinacridone, diketopyrrolopyrrole, benzimidazolone, disazo condensation, disazo, azo, metallic complex azo, dioxazine, naphthrone, phthalocyanine, or indanethrene-compound pigments. Among them, quinacridone, diketopyrrole, disazo, or phthalocyanine-compound pigments are more preferable, and diketopyrrole or disazo-compound pigments are particularly preferable.

In the present invention, a combination of two or more organic pigments, a solid solution of organic pigments, or a combination of an organic pigment and an inorganic pigment may also be used.

The organic-pigment aqueous dispersion according to the present invention is preferably prepared by the build-up method described above, especially by the pH-changing coprecipitation method. In the method of producing an organic-pigment aqueous dispersion by the pH-changing coprecipitation method, the organic pigment should be dissolved uniformly in an organic solvent sufficiently miscible with water (water may be contained) under basic or acidic condition, but the choice of the acidic or basic solvent can be determined dependent on the solubility of the pigment in interest which the pigment is apt to dissolve uniformly under acidic or basic condition. In general, in the case of the pigment having in the molecule thereof a group dissociative under alkaline, the alkaline medium is used, and in the case of the pigment having no group dissociative under alkaline and having in the molecule thereof many nitrogen atoms, to which protons easily adhere, the acidic medium is used. For example, quinacridone-, diketopyrrolopyrrole-, and condensed disazo-compound pigments can be dissolved in the alkaline medium, and a phthalocyanine-compound pigment can be dissolved in the acidic medium.

Examples of the bases used when the pigment is dissolved under basic condition include inorganic bases, such as sodium hydroxide, calcium hydroxide, and barium hydroxide; metal alkoxides, such as sodium methoxide, sodium t-butoxide, and potassium t-butoxide; and organic bases, such as trialkylamines, and diazabicycloundecene (DBU), and preferable are inorganic bases and metal alkoxides.

The amount of the base to be used is not particularly limited, as long as the base in the amount can make the pigment be dissolved homogeneously. In the case of the inorganic base, the amount thereof is preferably from 3 to 20 mole equivalents, to the pigment. In the case of the organic base, the amount thereof is preferably from 20 to 100 mole equivalents, to the pigment.

Examples of an acid to be used in the case that the pigment is dissolved in the acidic medium, include inorganic acids, such as sulfuric acid, hydrochloric acid, and phosphoric acid; and organic acids, such as acetic acid, trifluoroacetic acid, methanesulfonic acid, and trifluoromethanesulfonic acid. Among these, the inorganic acids are preferable, and sulfuric acid is especially preferable.

The amount of the acid to be used is not particularly limited, as long as the acid in the amount can make the pigment be dissolved homogeneously. In many cases, the acid is used in a larger or more excessive amount than the base. Regardless the kind of the acid being an inorganic acid or an organic acid, the amount of the acid to be used is preferably from 30 to 500 mole equivalents, to the pigment.

Next, the organic solvent that dissolves the pigment in the pH-changing coprecipitation method will be described. The organic solvent that can be used is an organic solvent that can dissolve the pigment sufficiently under basic or acidic condition, and that can be sufficiently miscible with water. Examples of the organic solvent include lower alcohol-compound solvents, such as methanol and ethanol; polyhydric alcohol-compound solvents, typified, for example, by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower monoalkyl ether-compound solvents of a polyhydric alcohol, such as ethylene glycol monomethyl (or ethyl)ether, diethylene glycol monomethyl (or ethyl)ether, and triethylene glycol monoethyl (or butyl)ether; amide-compound solvents, such as dimethylformamide, dimethylacetamide, 2-pyrrolidone, N-methyl-2-pyrrolidone, 1,3-dimethyl-2-imidazolidinone, urea, and tetramethyl urea; sulfur-containing-compound solvents, such as sulfolane, dimethylsulfoxide, and 3-sulfolene; polyfunctional compound solvents, such as diacetone alcohol, and diethanolamine; carboxylic acid-compound solvents, such as acetic acid, maleic acid, docosahexaenoic acid, trichloroacetic acid, and trifluoroacetic acid; and sulfonic acid-compound solvents, such as methanesulfonic acid, and trifluorosulfonic acid. These solvents may be mixed in combination with two or more thereof.

The organic solvent is preferably an amide-compound solvent or a sulfur-containing compound solvent in the case of alkaline, and a carboxylic acid-compound solvent, or a sulfonic acid-compound solvent in the case of acidic; more preferably the sulfur-containing-compound solvent in the case of alkaline, and a sulfonic acid-compound solvent in the case of acidic; and particularly preferably dimethylsulfoxide (DMSO) in the case of alkaline, and methanesulfonic acid in the case of acidic.

When the organic solvent is used to contain an amount of water, the blend ratio of water to the organic solvent is not particularly limited, as long as at the ratio it is possible to dissolve the pigment to be used homogeneously. Generally, in the case under alkaline condition, the organic solvent substantially contains no water, or the blend ratio of water to the organic solvent (water/organic solvent) is preferably from 0.005 to 10 (mass ratio). In the case under acidic condition in which an inorganic acid is used, it is preferable to use, for example, sulfuric acid alone, without using any organic solvent. When an organic acid(s) is used, the organic acid itself is an organic solvent. Thus, in order to adjust the viscosity and solubility of the organic solvent, a plurality of acids may be mixed or water may be added thereto. Preferably, the mass ratio of water to the organic solvent(s) (organic acid(s)) is from 0.005 to 0.1 (mass ratio).

If fine particles are formed in the flow channel, especially in the micro space of the channel, it is preferable to supply a homogeneously dissolved solution into the channel. Addition of suspension gives pigment fine-particles larger in particle diameter and wider in particle distribution, occasionally it further causes clogging of the channel easily. The "homogeneously dissolved solution" means a solution without any turbidity when observed under visible ray, and is defined, in the present invention, as a solution obtained by filtration through a microfilter of 0.45 μm or less or a solution leaving no solid when filtered through a filter of 0.45 μm.

Hereinafter, description will be made on the solvent that changes the hydrogen ion index (pH) in the channel in contact with the solution containing a pigment homogeneously dissolved therein (hereinafter, referred to as contact solvent). The contact solvent changes the hydrogen ion concentration and also plays a role as a poor solvent enabling precipitation of the pigment fine-particles generated. The contact solvent according to the present invention is generally water or an aqueous medium containing an organic solvent dissolved therein in the range that does not cause phase separation with water. Preferable examples of the organic solvent that may be contained in the contact solvent include lower alcohol-compound solvents, such as methanol and ethanol; polyhydric alcohol-compound solvents, typical examples thereof include ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; polyhydric alcohol lower alkyl ether-compound solvents, such as ethylene glycol monomethyl(or ethyl)ether, diethylene glycol monomethyl (or ethyl)ether, and triethylene glycol monoethyl(or butyl) ether; amide-compound solvents, such as dimethylformamide, dimethylacetamide, 2-pyrrolidone, N-methyl-2-pyrrolidone, 1,3-dimethyl-2-imidazolidinone, urea, and tetramethylurea; sulfur-containing-compound solvents, such as sulfolane, dimethylsulfoxide, and 3-sulfolene; multifunctional-compound solvents, such as diacetone alcohol, and diethanolamine; carboxylic acid-compound solvents, such as acetic acid, maleic acid, docosahexaenoic acid, trichloroacetic acid, and trifluoroacetic acid; and sulfonic acid-compound solvents, such as methanesulfonic acid, and trifluorosulfonic acid.

The organic solvent is preferably an amide-compound solvent or a sulfur-containing compound solvent in the case of alkaline, and a carboxylic acid-compound solvent, or a sulfonic acid-compound solvent in the case of acidic; more preferably the sulfur-containing-compound solvent in the case of alkaline, and a sulfonic acid-compound solvent in the case of acidic; and particularly preferably dimethylsulfoxide (DMSO) in the case of alkaline, and methanesulfonic acid in the case of acidic.

The concentration of the organic solvent in the aqueous medium is preferably such that the pigment would be 20 mass % or less, particularly preferably 10 mass % or less.

The following describes the hydrogen ion exponent (pH). The hydrogen ion exponent (pH) is the common logarithm of the reciprocal number of a hydrogen ion concentration (molar concentration), and may be called the hydrogen exponent. The hydrogen ion concentration is the concentration of hydrogen ion $H^+$ in a solution, and means the mole number of hydrogen ion present in a 1-liter solution. Since the hydrogen ion concentration changes in a very wide range, it is usually represented by the hydrogen ion exponent (pH). For example, pure water contains $10^{-7}$ mol of hydrogen ion at 1 atmosphere and 25° C. Thus, the pH thereof is 7, which is neutral. The aqueous solution having a pH of less than 7 is acidic, and the aqueous solution having a pH of more than 7 is alkaline. As a method of measuring the pH value, there are potentiometric and colorimetric measuring methods.

In preparation of the pigment dispersion according to the present invention, it is preferable to form the pigment fine-particles, by changing the hydrogen index (pH) in the course of flow in the channel, and the pH adjustment is carried out by using a channel having an inlet different from that for the homogeneous organic pigment solution. Specifically, the hydrogen ion concentration, i.e., the hydrogen index (pH), is adjusted close to neutral, by supplying a homogeneous solution containing a dissolved organic pigment through an inlet and a neutral, acidic or alkaline aqueous solution through another inlet, allowing those solutions brought into contact in the flow channel E.

In the case that pigment fine-particles are produced from a pigment dissolved in an alkaline aqueous medium, the change of the hydrogen ion exponent (pH) is generally performed within the range of 15.0 to 5.0, preferably 14.0 to 7.0. In the case that pigment fine-particles are produced from a pigment dissolved in an acidic aqueous medium, the change of the hydrogen ion exponent (pH) is generally performed within the range of 1.0 to 9.0, preferably 1.0 to 7.0.

When pigment fine-particles are produced, the reaction temperature in the channel is preferably within such a range that the solvent is not solidified or vaporized, and it is preferably from −20 to 90° C., more preferably from 0 to 50° C., and particularly preferably from 5 to 15° C.

The flow velocity (flow rate) of the fluid which flows in the channel is preferably from 0.1 mL/hour to 300 L/hour, more preferably from 0.2 mL/hour to 30 L/hour, further preferably from 0.5 mL/hour to 15 L/hour, and particularly preferably from 1.0 mL/hour to 6 L/hour.

In preparation of the organic-pigment aqueous dispersion according to the present invention, a dispersant may be added to the organic pigment-containing solution or/and the aqueous hydrogen index (pH)-changing solution. The dispersant have functions to (1) form fine pigment particles by being adsorbed on the surface of the freshly precipitated pigment, and to (2) prevent reaggregation of these particles. The dispersant for use in the present invention may be an anionic, cationic, ampholytic, nonionic or pigment-based low-molecular weight or polymer dispersant or a polymer dispersant. These dispersants may be used alone or in combination.

Examples of the anionic dispersing agent (anionic surfactant) include acyl-alkyltaurine salts (e.g. N-acyl-N-methyltaurine salts), fatty acid salts, alkylsulfates, alkylbenzenesulfonates, alkylnaphthalenesulfonates, dialkylsulfosuccinates, alkylphosphates, naphthalenesulfonic acid/formalin condensates, and polyoxyethylene-alkylsulfates. N-acyl-N-alkyltaurine salts are particularly preferable. These anionic dispersing agents may be used alone or in combination of two or more thereof.

Examples of the cationic dispersing agent (cationic surfactant) include quaternary ammonium salts, alkoxylated polyamines, aliphatic amine polyglycol ethers, aliphatic amines, diamines and polyamines derived from aliphatic amine and aliphatic alcohol, imidazolines derived from aliphatic acid, and salts of these cationic substances. These cationic dispersing agents may be used alone or in combination of two or more thereof.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkyl ethers, polyoxyethyl-enealkylaryl ethers, polyoxyethylene fatty acid esters, sorbitan fatty acid esters, polyoxyethylenesorbitan fatty acid esters, polyoxyethylenealkylamines, and glycerin fatty acid esters. Among these, polyoxyethylenealkylaryl ethers are preferable. These nonionic dispersing agents may be used alone or in combination of two or more thereof.

The pigmentary low-molecular or high-molecular dispersing agent is defined as a dispersing agent derived from an organic pigment as a parent material, and prepared by chemically modifying a structure of the parent material. Examples of the pigmentary dispersing agent include sugar-containing pigmentary dispersing agents, piperidyl-containing pigmentary dispersing agents, naphthalene- or perylene-derivative pigmentary dispersing agents, pigmentary dispersing agents having a functional group linked through a methylene group to a pigment parent structure, pigmentary dispersing agents (parent structure) chemically modified with a polymer, pigmentary dispersing agents having a sulfonic acid group, pigmentary dispersing agents having a sulfonamido group, pigmentary dispersing agents having an ether group, and pigmentary dispersing agents having a carboxylic acid group, carboxylic acid ester group or carboxamido group.

Examples of the polymer dispersing agent include polyvinyl pyrrolidone, polyvinyl alcohol, polyvinyl methyl ether, polyethylene oxide, polyethylene glycol, polypropylene glycol, polyacrylamide, vinyl alcohol/vinyl acetate copolymer, partial-formal products of polyvinyl alcohol, partial-butyral products of polyvinyl alcohol, vinylpyrrolidone/vinyl acetate copolymer, polyethylene oxide/propylene oxide block copolymer, polyacrylic acid salts, polyvinyl sulfuric acid salts, poly(4-vinylpyridine) salts, polyamides, polyallylamine salts, condensed naphthalenesulfonic acid salts, styrene/acrylic acid salt copolymers, styrene/methacrylic acid salt copolymers, acrylic acid ester/acrylic acid salt copolymers, acrylic acid ester/methacrylic acid salt copolymers, methacrylic acid ester/acrylic acid salt copolymers, methacrylic acid ester/methacrylic acid salt copolymers, styrene/itaconic acid salt copolymers, itaconic acid ester/itaconic acid salt copolymers, vinylnaphthalene/acrylic acid salt copolymers, vinylnaphthalene/methacrylic acid salt copolymers, vinylnaphthalene/itaconic acid salt copolymers; acryl polymers having an acid value of 60 to 200, and having a side chain whose terminal group is a carboxylic acid group; cellulose derivatives, and starch derivatives. Besides, natural polymers can be used, examples of which include alginic acid salts, gelatin, albumin, casein, gum arabic, tragacanth gum, and ligninsulfonic acid salts. Polyvinyl pyrrolidone is particularly preferable. These polymer dispersing agents may be used alone or in combination of two or more thereof.

In the present invention, a block copolymer may be used as the polymer dispersant. The block copolymer will be described in more detail. Specific examples of the block copolymers include the followings: acrylic or methacrylic block copolymers, polystyrene/other addition polymerization or polycondensation block copolymers, block copolymers having polyoxyethylene and/or polyoxyalkylene blocks. Any one of known block copolymers may also be used. In the present invention, the block copolymer more preferably has a block form of AB, ABA, ABD, or the like, in which A, B, and D each represent a different block segment. The block copolymer for use in the invention is preferably amphipatic. A typical preferable example thereof is an AB diblock copolymer having a hydrophobic segment and a hydrophilic segment of an organic acid or its ionic salt unit. Alternatively, an ABC triblock copolymer having a hydrophobic segment, a hydrophilic segment having an organic acid or its ionic salt unit, and another segment is also used preferably. The ABC triblock copolymer, if used, is preferably a copolymer containing A as hydrophobic segment, B as non-ionic hydrophilic segment, and C as hydrophilic segment having an organic acid or its ionic salt unit, and such a copolymer is preferable for stabilization of the inclusion state.

The molecular weight distribution, Mw (mass-average molecular weight)/Mn (number-average molecular weight), of the block copolymer that can be used in the present invention is preferably 2.0 or less, more preferably 1.6 or less, still more preferably 1.3 or less, and further preferably 1.2 or less. The number-average molecular weight Mn of the block polymer for use in the present invention is preferably 1,000 to 300,000. When the number-average molecular weight Mn of the block copolymer for use in the present invention is 1,000 to 300,000, it is possible to disperse a substance having a particular function favorably in a solvent.

Further, for improvement in dispersion stability and inclusion efficiency, the molecular movement of the block copolymer is preferably more flexible, because it is more compatible with the colorant substance surface as it is entangled physically. As will be described in detail below, it is preferably more flexible for forming a coating layer (a covering layer) on a recording medium. In particular when used in ink, the block copolymer is preferably more flexible for easier formation of a coating layer of the block copolymer on the recording medium. The coating layer of the block copolymer allows prevention of oxidation or photodegradation of the contained colorant and improvement in weather resistance. For that purpose, the glass transition temperature Tg of the block polymer main chain is preferably 20° C. or lower, more preferably 0° C. or lower, and more preferably −20° C. or lower. A polymer having a polyvinyl ether structure, which has a lower glass transition point and thus is more flexible, is used favorably from this point as well.

The blending amount of the dispersant is preferably in the range of 0.1 to 250 parts by mass, more preferably in the range of 1 to 100 parts by mass, with respect to 100 parts by mass of the pigment, for further improvement of storage stability and uniform dispersibility of the pigment.

In a preferable embodiment of the method of producing the pigment aqueous dispersion according to the present invention, at least one anionic surfactant is contained as the dispersant. The anionic surfactant for use is preferably an anionic surfactant having a solubility of 2 mass % or more, more preferably an anionic surfactant having a solubility of 5 mass % or more, in the organic solvent used for dissolving the pigment. Further preferably, it is an anionic surfactant having a solubility of 5 mass % or more in an aprotic polar solvent. Particularly preferably, it is an anionic surfactant having a solubility of 5 mass % or more in an aprotic polar solvent dimethylsulfoxide (DMSO). Examples of the anionic surfactant soluble in such an organic solvent include acylmethyltaurine salts, alkylsulfate ester salts, dialkylsulfoscuccinate salts, polyoxyethylenealkylsulfate ester salts, or, the compounds represented by formula (I), respectively having a molecular weight of 400 to 2,000; among them, acylmethyltaurine salts, polyoxyethylenealkylsulfate ester salts, and the compounds represented by formula (I), each having molecular weight of 400 to 1,000, are preferable; polyoxyethylenealkylsulfate ester salts and the compounds represented by formula (I), each having a molecular weight of 450 to 800, are more preferably; and use of a compound represented by formula (I) is particularly preferable.

Use of an organic solvent-soluble anionic surfactant in this manner is preferable, because it is possible to make the anionic surfactant contained in the pigment-dissolved organic solvent, when producing the pigment aqueous dispersion by the coprecipitation method. More specifically, the surfactant is preferably contained in the pigment solution, rather than in the aqueous medium for changing pH, when producing the organic pigment aqueous dispersion by the pH-changing coprecipitation method. In this way, it is possible to obtain an aqueous dispersion high in dispersion stability that contains fine particles smaller in particle diameter, narrower in particle diameter distribution, and more resistant to aggregation of the fine particles even at higher concentration. In the present invention, the aprotic polar solvent is defined as a solvent containing no dissociative hydrogen and having a pKa of 20 or less, and typical examples thereof include dimethylsulfoxide, N,N-dimethylacetamide, N-methylpyrrolidone, 1,3-dimethyl-2-imidazolidione, acetonitrile, tetrahydrofuran, and ethyleneglycol dimethyl ether.

In the present invention, as described above, as the anionic surfactant, use may be preferably made of a compound represented by formula (I).

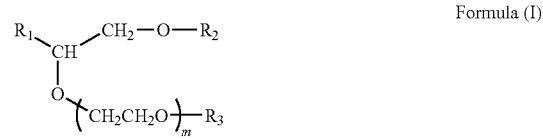

Formula (I)

In the formula, $R_1$ represents an alkyl group having 5 to 20 carbon atoms. $R_2$ represents an alkyl, alkenyl, or alkynyl group having 3 to 10 carbon atoms. $R_3$ represents —$SO_3M$ or —$(CH_2)_n$—COOM (wherein M represents sodium, potassium, or ammonium ion; and n is 1 or 2). m is an integer of 1 to 20.

More specifically as for $R_1$ and $R_2$, $R_1$ is preferably a straight- or branched-chain alkyl group having 5 to 20 carbon atoms; and $R_2$ is preferably a straight- or branched-chain alkyl, alkenyl, or alkynyl group having 3 to 20 carbon atoms. More preferably, $R_1$ is a straight- or branched-chain alkyl group having 8 to 12 carbon atoms; and $R_2$ is a straight-chain alkyl, alkenyl or alkynyl group having 3 to 10 carbon atoms. Particularly preferably, $R_1$ is a straight- and branched-chain decyl or dodecyl group-containing alkyl group; and $R_2$ is a 1-propyl, 2-propen-1-yl, or 2-propyn-1-yl group.

More specifically as for $R_3$ and m, $R_3$ is preferably —$SO_3NH_4$, or —$CH_2COONa$; and m is an integer of 3 to 12. Particularly preferably, $R_3$ is —$SO_3NH_4$; and m is 5 or 10. However, m is a numerical value showing the number of PEO groups (polyethyleneoxy groups) present most abundantly at a content of 50% or more.

Hereinafter, specific examples of the anionic surfactant represented by formula (I) that can be used in the present invention will be shown, but the invention is not limited thereto.

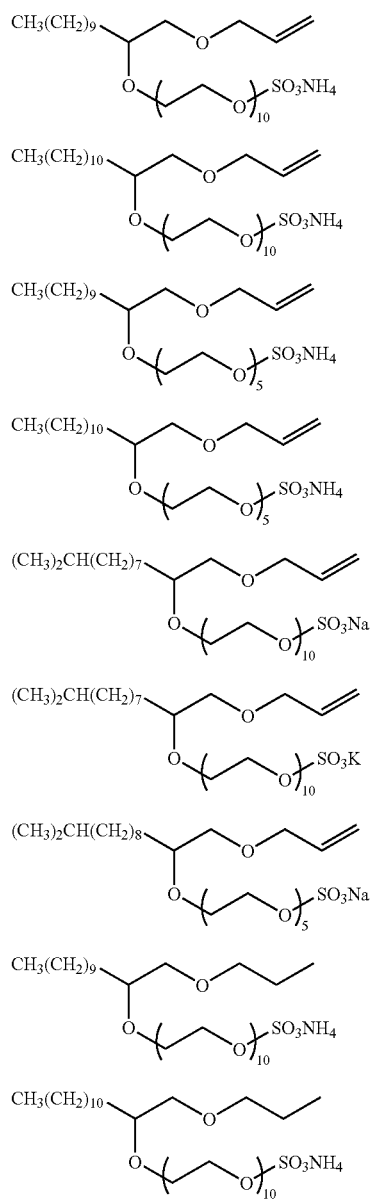

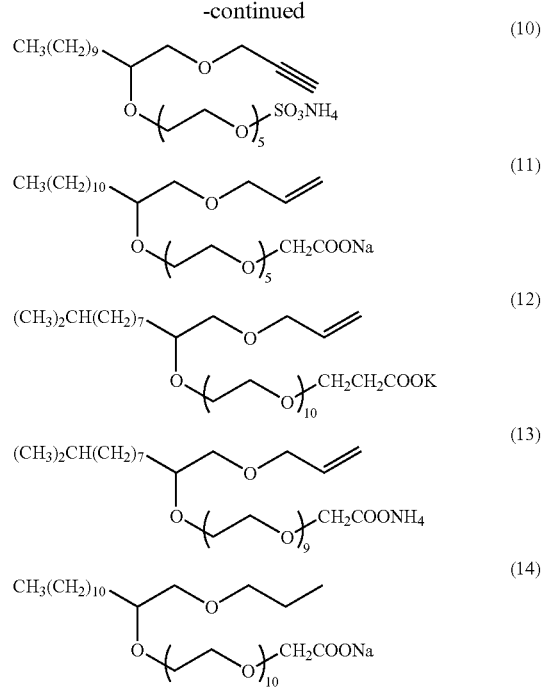

The anionic surfactant represented by formula (I) above can be prepared, according to the methods as described in JP-A-7-18009, JP-A-7-18010, and JP-A-1'-349612, with or without modification.

The anionic surfactants represented by formula (I) may be used alone or in combination of two or more. When two compounds are used, the blending ratio thereof is not particularly limited.

The organic-pigment aqueous dispersion according to the present invention is preferably treated by heating. The preferable heating temperature is 30° C. to 99° C., more preferably 50° C. to 90° C. The dispersion may be heated in a batch reactor or in the course of flow in a micro channel. The period of time for heating is not particularly limited, but preferably 1 to 400 minutes, more preferably 2 to 200 minutes. The heating is preferable, because it reduces the viscosity of the dispersion and improves the storage stability thereof.

The heating temperature during heat treatment of the dispersion of pigment fine-particles according to the present invention may vary according to the kind and the amount of the pigment, the kind(s) of coexistent compound(s), and others, but it is preferably 40° C. to 100° C., more preferably 50 to 100° C., and particularly preferably 60 to 95° C. The temperature before heat treatment is not particularly limited, but preferably 60° C. or lower, more preferably 0 to 40° C., and particularly preferably 10 to 40° C. When the temperature immediately before precipitation of organic pigment fine-particles in a microreactor device, for example, by the build-up method (in other words, temperature of the organic pigment solution and poor solvent before mixing) is regarded as the temperature before heating, the heat treatment can be carried out by raising the temperature for precipitation of the organic pigment fine-particles to a temperature higher than the aforementioned temperature before heating.

The embodiment of heat treatment is not particularly limited thereto, and the heat treatment may be carried out by: forming a dispersion by precipitating pigment fine-particles, and then heating the dispersion to a temperature higher than the temperature for precipitation of the pigment fine-particles; and the heat treatment may be carried out in a tank different from that used for precipitation of the pigment fine-particles. For example, if the dispersion containing precipitated pigment fine-particles is processed additionally in a step(s) such as of purification or concentration after its preparation, the dispersion may be heat-treated in any phase, independently of the order. For example, use may be taken of: a mode in which the organic pigment fine-particle dispersion may be heated in the channel, and then washed and concentrated; another mode in which the washed dispersion may be fed back into the channel, heated therein, and then concentrated; or yet another mode in which the dispersion may be washed, concentrated, and then brought into again in the course of flow in the channel, thereby conducting the heating. For simplicity of operation, a preferable mode is one in which the dispersion is preferably heated in the channel, and then, washed and concentrated. For example in heating the dispersion in the channel, it is possible to perform particle precipitation and heating consequently, by connecting a heating unit to the outlet of microreactor, which is advantageous from the viewpoint of production cost.

Such a heat treatment can give an aqueous dispersion of pigment fine-particles with reduced viscosity increase. Thus, for example, it is possible to concentrate the aqueous dispersion readily, improve the ejection efficiency as inkjet ink, and suppress change in particle diameter with the lapse of time. It is also advantageous in that it is possible to preserve its favorable transparency when the aqueous dispersion is concentrated.

The diameter of the channel when subjecting to heat treatment of the liquid therein is not particularly limited, but the channel preferably has a region where the equivalent diameter thereof is in the range of 0.1 mm or more and 16 mm or less. Reduction of channel diameter and thinning of the channel wall thickness lead to accelerated heat exchange, and thus, it is possible to raise the internal temperature quickly to a temperature almost the same as the external temperature and to heat the entire liquid to a uniform temperature evenly by heating for a constant time period. However, it may also leads to decrease in the amount of liquid to be heat-processed during a unit time or excessive shortening of the heating time, and thus, a channel having a suitable diameter is preferably selected according to applications. It is also possible to connect, to a thin channel for rapid heat exchange, a thick channel for assuring sufficient heating time, which is one of preferable methods.

The flow velocity and the channel length in the heating unit are also not particularly limited, and may be adjusted appropriately to desired values. Preferably, the combination of heating-unit diameter, flow velocity, and channel length is selected to assure a liquid heating time of 10 seconds or more. This is because a too short heating time may prohibit desired advantage of the present invention in some cases. The maximum heating time is not particularly limited, but is preferably 5 hours or less, from the viewpoints of preservation of particle diameter and cost. The heating time is more preferably 15 seconds or more and 3 hours or less, still more preferably 20 seconds or more and 2.5 hours or less, and particularly preferably 60 seconds or more and 2.5 hours or less.

If the organic-pigment aqueous dispersion according to the present invention contains a polymerizable compound, the dispersion may be subjected to polymerization treatment. The polymerization treatment is carried out, for example, by adding a polymerization initiator and initiating polymerization by heating or UV irradiation. Then, the resultant polymer may be present on the surface of the organic pigment fine-particles or inside the pigment fine-particles, or it is sufficient that all of the polymer (or part of it) is in tight contact with the organic pigment fine-particles, and it is preferable that the polymer would not leave from the pigment fine-particles to keep the adhered state between the pigment fine-particles and the polymer even when the fine particles migrate in the dispersion. Herein, the "polymer" means a compound generated by polymerization of two or more molecules of a polymerizable compound, and all polymerizable compounds on the fine particles may not be involved in the polymerization reaction, and there may be residual unreacted polymerizable compound.

With respect to the method of measuring a particle diameter of the organic pigment fine-particles to be contained in the pigment aqueous dispersion, there are some ways to express the average size in a group with numerical values, and those commonly used include mode diameter showing the maximum value of distribution, median diameter equivalent to the median value in the integral frequency distribution curve, and various average diameters (length-average, area-average, mass-average, number-average (MN), volume-average (MV), etc.). The average particle diameter referred to in the present invention is expressed in a volume-average diameter (MV), unless specified otherwise. In the present invention, measurement of the particle diameter of the organic pigment fine-particles before concentration of the dispersion is carried out by using the dispersion prepared as it is, while measurement of that of the dispersion after concentration is performed by using a diluted dispersion sample obtained after diluting the concentrated solution to a concentration of 1.0 mass % with distilled water. Also in the present invention, the particle diameter of the organic pigment fine-particles is a value determined by dynamic light scattering method, unless specified otherwise. In the present invention, the particle diameter of the organic pigment fine-particles is preferably 1 to 100 nm, particularly preferably 3 to 80 nm, as determined after dilution to 1.0 mass % after concentration.

Uniformity in particle diameter of fine particles, i.e., a monodisperse fine-particle system, means that the size of the particles contained is uniform, and in addition, there is no fluctuation in chemical composition and crystalline structure in an individual particle among the particles. Thus, the degree of uniformity or monodispersion is an important factor determining the properties of the particles. Especially when the particles are ultrafine particles having a particle diameter in nanometer order, it is a particularly important factor governing the properties of the particles. The pH-changing coprecipitation method used in preparing the pigment aqueous dispersion according to the present invention, is preferable as a production method of producing fine particles smaller in particle diameter and allowing control and adjustment of the size of the particles. There are variety of methods available as an indicator of the uniformity in size, and, in the present invention, a value, volume-average diameter MV divided by number-average diameter MN (i.e. MV/MN), is used as the indicator for the monodispersity (which means the width in the particle size distribution is narrow). If the value is closer to 1, it indicates particles excellent in the monodispersity. In the present invention, the monodispersity (as determined after dilution with distilled water to 1 mass % after concentration) of the organic pigment fine-particles is preferably 1.20 to 1.80, more preferably 1.20 to 1.60, and particularly preferably 1.20 to 1.40.

The pigment aqueous dispersion produced by a method based on the pH-changing coprecipitation method contains the organic solvent used for dissolution of the pigment, and thus, according to the application of the aqueous dispersion, there may be needed purification operation for removing the solvent and concentration operation for increase in concentration. The operations are preferably carried out by an ultrafiltration method. The purification operation is carried out under circulation in a circulating ultrafiltration device having a suitable ultrafiltration membrane (preferably a hollow fiber membrane), while distilled water (that may contain a small amount of surfactant) is added gradually for keeping the total liquid amount constant. The operation removes the organic solvent contained, the excessive low-molecular weight dispersant, and the base, and others, giving a dispersion containing almost only water as the solvent to disperse the pigment fine-particles. Termination of addition of distilled water after almost completion of purification leads to subsequent concentration operation. The concentration operation in the circulating ultrafiltration device may be continued to a viscosity as far as circulation is possible, generally to a pigment concentration of approximately 10 mass %. At a concentration higher than that, the dispersion is generally significantly viscous, and thus, is concentrated by pressure filtration or film concentration under reduced pressure by using, for example, a flat ultrafiltration membrane instead of circulation ultrafiltration device. In this way, it is possible to concentrate the dispersion up to a concentration of approximately 30 mass %. The pigment concentration in the aqueous dispersion according to the present invention is generally 6 to 30 mass %, particularly preferably 6 to 20 mass %. In the present invention, the ultrafiltration is to eliminate inorganic substances, the solvent of molecular weight 1,000 or less, and excess organic compounds, such as surfactant, each of which is dissolved in the pigment dispersion, and preferably it is to eliminate inorganic salts and organic compounds of molecular weight 500 or less. The ultrafiltration membrane for use is not particularly limited, if it is satisfactory for these purposes, but is preferably a hollow fiber membrane or a ceramic membrane high in efficiency.

An advantage of the pigment aqueous dispersion according to the present invention is that it is low in haze and transparent even at a high pigment concentration, and that the film prepared by using the same is similarly low in haze and transparent. In the present invention, the haze of the aqueous dispersion is a value obtained by, in the case of aqueous dispersion, enclosing the dispersion in a special transparent-glass (preferably quartz glass) cell having an optical distance of 0.2 mm, and analyzing the cell with integrating-sphere photoelectric photometry. Further, the haze of the film formed from the aqueous dispersion is a value obtained by analyzing a film sample prepared by the operations 1 to 4 described below with integrating-sphere photoelectric photometry. Herein, the haze (Th) is a value obtained by dividing the diffuse transmittance (Td) of a test cell and the film sample, by the total light transmittance (Tt), and multiplying the quotient by 100, and the unit thereof is %. Specifically, Th (%)=Td/Tt×100. A smaller Th value means lower haze, i.e. higher transparency.

When the haze (Th) of the aqueous dispersion according to the present invention, is determined by the method described above, with an aqueous solution at a pigment concentration of 6 to 30 mass %, the resultant Th is generally 0.3 to 10%, preferably 0.3 to 8%. Alternatively, the Th of an aqueous dispersion at a pigment concentration of 6 to 10 mass % is preferably 0.3 to 5%. An aqueous dispersion having a Th value in the range above is high in transparency by visual observation with the naked eye.

The haze of the aqueous dispersion according to the present invention, as determined by a film sample prepared by the following operations 1 to 4, is preferably 0.5 to 5%. The film prepared by using the aqueous dispersion having such a low haze is a colored film high in transparency by visual observation.

1. The concentration of the organic-pigment aqueous dispersion is adjusted with distilled water to 5 mass % (to give a dispersion A).
2. Polyvinyl alcohol (e.g., Kuraray Poval PVA205, trade name) is added to the dispersion A at a mass ratio of 10%, and the mixture is agitated thoroughly (to give a dispersion B).
3. The dispersion B is applied on a transparent glass to give a film thickness of 20±2 μm with a bar coater.
4. The thus-formed coated film is dried at 50° C. for 3 hours.

Hereinafter, the colored coating composition of the present invention will be described. The colored coating composition of the present invention contains the organic-pigment aqueous dispersion as colorant, and additionally, at least one inorganic oxide as matrix component (in the present invention, the matrix component is defined as a material for bonding the organic pigment fine-particles and others contained in the coloring component onto a substrate such as glass). The primary raw material generating the inorganic oxide is preferably a metal alkoxide and/or a hydrolytic condensate from a metal alkoxide. The metal alkoxide is preferably a compound represented by formula (A):

$$R_1nM(OR_2)m-n \qquad \text{Formula (A)}$$

wherein $R_1$ each independently represent a substituted or unsubstituted organic group; M represents a metal atom; $R_2$ each independently represent a lower alkyl group; m represents the oxidation number of the metal; and n is an integer of 0 to 2.

Examples of the metal (M) in the metal alkoxide include silicon (Si), titanium (Ti), zirconium (Zr), aluminum (Al), zinc (Zn), iron (Fe), cobalt (Co), nickel (Ni), beryllium (Be), magnesium (Mg), calcium (Ca), strontium (Sr), barium (Ba), scandium (Sc), yttrium (Y), lanthanum (La), cerium (Ce), hafnium (Hf), vanadium (V), niobium (Nb), tantalum (Ta), chromium (Cr), molybdenum (Mo), tungsten (W), manganese (Mn), copper (Cu), boron (B), gallium (Ga), indium (In), thallium (Ti), germanium (Ge), tin (Sn), lead (Pb), phosphorus (P), arsenic (As), antimony (Sb), bismuth (Bi), sulfur (S), selenium (Se), and tellurium (Te). In particular, silicon, titanium, zirconium, and aluminum can be used preferably.

The substituted or unsubstituted organic group $R_1$ in the metal alkoxide is preferably a (cyclo)alkyl, aryl, aralkyl, alkenyl, or other substituted alkyl group. Examples of the (cyclo)alkyl group include methyl, ethyl, propyl, butyl, isopropyl, cyclopentyl, and cyclohexyl groups. The aryl group is, for example, a phenyl group. The aralkyl group is, for example, a benzyl group. The alkenyl group is, for example, a vinyl group. Examples of the above-mentioned other substituted alkyl group include methacryloxypropyl, glycidoxypropyl, epoxycyclohexylethyl, aminopropyl, aminoethylaminopropyl, mercaptopropyl, ureidopropyl, isocyanatopropyl, and trifluoropropyl groups. If $R_1$ is a substituted organic group, it may be part of a polymer chain.

The $R_2$ group in the metal alkoxide is preferably a lower alkyl group. In particular, alkyl groups having 1 to 6 carbon atoms are preferable, and a methyl, ethyl, propyl, isopropyl, or butyl group is more preferable.

The oxidation number m of the metal M is preferably 2 to 8, more preferably 3 to 4.

Typical examples of the metal alkoxide include the following compounds. Examples of silane alkoxide include tetramethoxysilane, tetraethoxysilane, methyltrimethoxysilane, methyltriethoxysilane, ethyltrimethoxysilane, n-propyltrimethoxysilane, isobutyltrimethoxysilane, phenyltrimethoxysilane, phenyltriethoxysilane, vinyltrimethoxysilane, γ-methacryloxypropyltrimethoxysilane, γ-glycidoxypropyltrimethoxysilane, dimethyldimethoxysilane, diphenyldimethoxysilane, cyclohexylmethyldimethoxysilane, phenylmethyldimethoxysilane, and γ-glycidoxypropylmethyldimethoxysilane.

Examples of the metal alkoxide of titanium include tetraisopropoxytitanium, and tetra-n-butoxytitanium.

Examples of the metal alkoxide of zirconium include tetra-n-butoxyzirconium. Examples of the metal alkoxide of aluminum include tri-s-butoxyaluminum.

The homooligomer or heterooligomer of the respective metal alkoxide may be used as the metal alkoxide that can be used in the present invention.

These metal alkoxides may be used alone or in combination of two or more. When two or more silane alkoxides are used in combination, at least one of them is preferably the compound represented by formula (A), wherein n is 1.

In the present invention, the hydrolytic condensate of a metal alkoxide may be used. The metal-alkoxide hydrolytic condensate is obtained by a common method. For example, it is prepared by dissolving one or a mixture of two or more of the metal alkoxides above in a suitable solvent, adding a catalyst and water thereto, mixing the resultant mixture, and agitating the mixture for conducting the reaction.

As described above, the dispersion of organic pigment fine-particles, the coloring component for use in the present invention, is preferably an aqueous dispersion obtained by the pH-changing coprecipitation method, and the colored coating composition according to the present invention is preferably prepared with a solvent containing water as the principal component. In the present invention, the meaning of the terms "prepared with a solvent containing water as the principal component" are defined as that 50 mass % or more of the volatile components contained in the colored coating composition is water. When a solvent other than water is added as a volatile component, the solvent preferably is water-soluble, and more preferably, the additional solvent is an alcohol-compound solvent.

Typical examples of the alcohol-compound solvent include methanol, ethanol, propanol, isopropanol, butanol, isobutanol, ethyleneglycol, ethyleneglycol monomethyl ether, ethyleneglycol monoisopropyl ether, ethyleneglycol monobutyl ether, diethyleneglycol monomethyl ether, and propyleneglycol monomethyl ether. These solvents may be used alone or in combination of two or more. Preferable alcohol-compound solvents are methanol, ethanol, and ethyleneglycol.

A catalyst may be used for preparation of the metal alkoxide sol, and examples of the catalyst include inorganic acids, such as hydrochloric acid, nitric acid, sulfuric acid, and phosphoric acid; organic acids, such as formic acid, acetic acid, oxalic acid, maleic acid, and trifluoroacetic acid; bases, such as potassium hydroxide, sodium hydroxide, calcium hydroxide, and ammonia; organotin compounds, such as dibutyltin dilaurate, and dibutyltin diacetate; metal chelate compounds, such as aluminum tris(acetylacetonate), titanium bis(butoxy)bis(acetylacetonate), and zirconium bis(isopropoxy)bis(acetylacetonate); and boron compounds, such as boric butoxide, and boron trifluoride. These catalysts may be used alone or in combination of two or more thereof.

The temperature of the sol-forming reaction is generally room temperature at 20 to 30° C., but the colored coating composition may be prepared under heating or cooling for controlling the reaction.

The colored coating composition according to the present invention can be prepared, by adding a dispersion of organic pigment fine-particles as coloring component, to a solution containing a metal alkoxide and/or a metal-alkoxide hydrolytic condensate as matrix component. The blending rate is not particularly limited, but the content of the metal alkoxide and/or the metal-alkoxide hydrolytic condensate in the composition is preferably 0.1 to 50 mass %, and the content of the organic pigment (in other words, the content of organic pigment in organic pigment fine-particle dispersion) is preferably 0.01 to 10 mass %; and the former is more preferably approximately 1 to 20 mass % and the latter 0.1 to 5 mass %. Considering transportation, storage, and other factors, the solution of the metal alkoxide and/or the metal-alkoxide hydrolytic condensate solution and the pigment dispersion may be provided separately, and mixed to the concentration above when using or producing the composition, to give the colored coating composition according to the present invention.

The colored coating composition according to the present invention may contain, as needed, an additive, for example, an ultraviolet absorbent, an infrared absorbent, a photostabilizer, and a leveling agent. Alternatively for improvement of the physical properties of coated film, a polymer, such as a polyol resin, a polyisocyanate compound or a silicone resin, may be added to the composition.

The colored coating composition thus obtained may be applied onto a coating substrate, by a method, for example, of roller coating, spin coating, immersion (or dipping) coating, flow curtain coating, spray coating, reverse coating, flexographic printing, or screen printing.

The substrate to be coated is not particularly limited, but it is preferably a substrate providing the advantages of the colored coating composition according to the present invention, and particularly, a metal substrate (in particular, glossy surfaced), glass (glass plate, glass fiber, glass tube, or the like), a plastic material, or a ceramic material is preferable. When the final product is used, for example, in display devices, a light-transmitting material, such as glass, is particularly preferable.

A film can be formed on the coating substrate by applying the colored coating composition according to the present invention thereon and drying the coated film. The drying temperature in the drying step is not particularly limited, but preferably 20 to 150° C., more preferably 50 to 100° C. If a protective film-coating solution is applied on the colored film after formation, it is possible to obtain an organic pigment-colored substrate by heat-treating the film at a temperature of 250 to 400° C. and thus hardening the colored film and the protective film simultaneously. According to the present invention, it is possible to make the resultant film structure of the colored film dense, by baking it at the raised temperature as above.

The thickness of the colored film is not particularly limited and may be determined arbitrarily according to application, but the thickness of the film after drying is preferably 10 to 500 nm, more preferably 50 to 300 nm.

The substrate thus obtained has a uniform, transparent, and strongly colored film. When the colored film is formed on a light-transmitting material (e.g., glass), the film obtained absorbs a light selectively in a particular wavelength region, according to the pigment contained, and thus, it can be used as a color filter in display devices. Examples of the display device in which such a color filter is applied, include liquid crystal display devices, color television picture tubes, monochromic television picture tubes, plasma display devices, and organic electroluminescent display devices.

In addition to color filter, the colored glass prepared by using the composition according to the present invention is applicable to various applications including industrial materials, such as construction window material, partitioning material, vehicle window material, and others, in particular for decoration. For example, as an example of the utilization of the composition of the present invention, it is applicable as a functional glass exhibiting both privacy preservation and outer appearance (design thereof) that is used in public spaces. Further, for example in production of a commonly-used plate glass, the colored glass may be crushed into a cullet raw material of approximately 5 cm square in size and added into a melting furnace for repeated melting and recycling. As described above, the colored glass prepared by using the colored coating composition according to the present invention is not limited to plate glass, and it is applicable to other glasses, such as bottle glass. It is also recyclable as a cullet raw material for various glasses.

The colored coating composition according to the present invention is advantageous in that it is possible to make the film thus prepared by using the composition low in haze and high in transparency. The haze of the film prepared by using the colored coating composition according to the present invention is a value obtained by forming a film by coating the composition on a quartz glass plate having a thickness of $1.0\pm0.1$ mm by spin coating to a thickness after drying of $300\pm30$ nm and analyzing the film-carrying colored glass plate with integrating-sphere photoelectric photometry, unless specified otherwise. The haze (Th) is a value obtained by dividing the diffuse transmittance (Td) of the film-carrying colored glass by the total light transmittance (Tt) and multiplying the quotient by 100, and the unit is %. That is, the haze can be represented by the formula: $Th\ (\%) = (Td/Tt) \times 100$.

The film on the glass plate was prepared through spin coating and drying steps so that the thickness would be $300\pm30$ nm. The production conditions for such a film vary according to the physical properties of the colored coating composition and cannot be specified definitely, and the conditions for preparation of a film having a thickness of $300\pm10$ nm for each sample should be determined by trial and error. For example, the drying condition may be determined properly according to the physical properties of each sample, but, for example, the drying can be carried out at 30 to 200° C. for 5 to 60 minutes. The film thickness of the film prepared is a value obtained by using a stylus profilometer (DEKTAK 6M, trade name, manufactured by ULVAC), unless specified otherwise.

The haze (Th) of the colored glass (film thickness: $300\pm10$ nm, glass thickness: $1.0\pm0.1$ mm) prepared by using the colored coating composition according to the present invention is preferably 0.03 to 0.1%, more preferably 0.03 to 0.05%. The value is in a range almost the same as that in the case where a usual dye is used, which is difficult to achieve with a conventional pigment-based colorant. The film thus obtained satisfies the requirement in transparency practically needed at high level.

The transparent nano-sized pigment aqueous dispersion according to the present invention provides a material applicable not only as a colored coating agent but also as a colored coating agent for a wide variety of structural materials. Typical examples of the thus-coated articles include colored coated articles for materials and parts (glass, plastic, glossy-surfaced metal plate, etc.) for use in electronic, construction, advertising display (signboard, poster, etc.), illumination (electric lamp, fluorescent lamp, etc.), vehicle (exterior part, interior part, etc.), and mirror. In particular, the coated article of the present invention is useful as one for advertising display, illumination, and vehicle.

According to the present invention, it is possible to provide an organic-pigment aqueous dispersion having high transparency (low haze) even when the pigment concentration is raised by concentration; and provide a method of producing the same, and a colored coating composition and a coated article each of which obtained by using the same. More specifically, according to the present invention, it is possible to provide a pigment fine-particle aqueous dispersion resistant to aggregation of the pigment fine-particles therein even at high concentration by improving dispersibility upon concentration of the dispersion prepared by the build-up method; and provide an method of efficiently producing the same, and a colored coating composition and a coated article each prepared by using the same that gives a colored film which is excellent in uniformity and transparency and which has favorable film physical properties.

The organic pigment aqueous dispersion according to the present invention is quite advantageous in that it is highly transparent even at high concentration and gives a colored film low in haze. The organic-pigment aqueous dispersion according to the present invention is useful in applications, for example, as a colorant to be contained in metallic basecoat paints, and improves the brilliance of the coated film without deterioration in the color depth and high saturation of metallic basecoat paint when colored because of its high transparency at high concentration; and additionally it is also environmentally friendly, because it does not require any use of a chelate dye containing a heavy metal, such as chromium (environmentally hazardous material). Further, the present invention provides a highly transparent colored coating composition and coated article prepared by using the aforementioned favorable organic-pigment aqueous dispersion. Further, the present invention exhibits such advantageous effects that it is possible to form and color a highly transparent and low-in-haze film by using the composition and article of the present invention. The colored coating composition according to the present invention is also useful in applications for production, for example, of high-transparency colored glass, high-glossiness colored metal plate, and high-contrast liquid crystal or color filter; and the composition, which allows use of water as the main solvent, can provide an environmentally friendly film-coating method. Thus, the coated article produced by using the organic pigment aqueous dispersion according to the present invention is highly useful.

The present invention will be described in more detail based on the following examples, but the invention is not limited thereto.

EXAMPLES

The particle diameter distribution described in the following examples and comparative examples was determined by using Microtrac UPA150, trade name, manufactured by Nikkiso Co., Ltd. The haze was determined by using an integrating-sphere photoelectric photometer (NDH2000, trade name, manufactured by Nippon Denshoku Co., Ltd.), unless specified otherwise.

As for the anionic surfactant used in Examples and Comparative Examples, the solubility in DMSO of the compound represented by formula (I) used in Examples was 15 to 30% and thus, the compound was favorably soluble in dipolar aprotic organic solvents. For that reason, it was possible to dissolve the compound in the pigment-containing solution at high concentration. On the other hand, a typical anionic surfactant used in Comparative Examples, N-oleoyl-N-methyltaurine sodium salt, had a solubility in DMSO of approximately 1%, and it was difficult to dissolve it in dipolar aprotic organic solvents at high concentration. Thus, it was difficult to add it into the pigment-containing solution (Liquid I) in a sufficient amount as dissolved, and it was only used practically as it was added to the aqueous solution (Liquid II).

Example 1

First, 0.5 g of 2,9-dimethylquinacridone (PR122, manufactured by Clariant, HOSTAPERM PINK E, trade name) was mixed with 7.0 mL of dimethylsulfoxide, 0.85 mL of methanol solution (manufactured by Wako Pure Chemical Industries, Ltd.) of 28% sodium methoxide, and 0.5 g of Exemplified compound (I), to prepare a homogeneously solution, which is designated to Liquid IA. The pH of the Liquid IA exceeded the measuring limit (pH 14), and was not able to be measured. Distilled water was designated as Liquid IIA. They were allowed to pass through a micro-filter of 0.45 μm (manufactured by Sartorius Co.), to remove impurities such as dust. Then, the reaction was effected in the following procedure, using a simple reactor having a channel configuration of a reactor in FIG. 2-1. More specifically, two Teflon (Registered Trademark) tubes having a length of 50 cm and an equivalent diameter of 1 mm were connected to two inlets of a Teflon (Registered Trademark) Y-shaped connector (manufactured by Tokyo Rika Kikai Corporation) having an equivalent diameter of 500 μm, using a connector. At ends of the tubes, syringes respectively containing the Liquids IA and IIA were connected and set at a pump. At an outlet of the connector, a Teflon (Registered Trademark) tube having a length of 1.5 m and an equivalent diameter of 500 μm was connected. The Liquid IA was sent out at a solution sending speed of 96 mL/h, and the Liquid IIA was sent out at a solution sending speed of 600 mL/h (Reynolds number: about 500). A dispersion of 2,9-dimethylquinacridone was collected from the tip end of the outlet of the tube, and the pH of the thus-collected dispersion was about 13.0. The volume average particle diameter MV of the obtained dispersion was 19.5 nm, and the ratio of Volume average particle diameter MV/Number average particle diameter MN that is an index of monodispersity was 1.40. Then, the pigment dispersion was purified in an ultrafiltration device (UHP-25K, trade name, manufactured by Advantec MFS, Inc., fractional molecular weight: 200,000) while the total liquid amount is held constant by addition of distilled water, and then, concentrated, to give an aqueous dispersion (sample 1) at a pigment concentration of 7.5 mass %. Analysis of the particle diameter after the concentrated dispersion was diluted to 1 mass % showed that the volume-average diameter MV of the fine particles contained was 20.8 nm and the ratio of Volume average particle diameter MV/Number average particle diameter MN that is an index of monodispersity was 1.45.

Comparative Example 1

First, 0.5 g of 2,9-dimethylquinacridone (PR122, manufactured by Clariant Co. Ltd., HOSTAPERM PINK E, trade name) was mixed with 7.0 mL of dimethylsulfoxide, and 0.85 mL of methanol solution (manufactured by Wako Pure Chemical Industries, Ltd.) of 28% sodium methoxide, to prepare a homogeneously solution, which is designated to Liquid IB. The pH of the Liquid IB exceeded the measuring limit (pH 14), which was not able to be measured. A sodium N-oleoyl-N-methyltaurine salt as an anionic surfactant was dissolved in a distilled water to prepared 0.1 mass % aqueous solutions, it was designated as Liquid IIB. They were allowed to pass through a micro-filter of 0.45 μm (manufactured by Sartorius Co.), to remove impurities such as dust. Then, particle dispersion was prepared in the same manner as that of the Example 1, except that the Liquid IA and IIA was altered the Liquid IB and IIB. The pH of the solution was about 13.0. The volume average particle diameter MV of the prepared dispersion was 20.5 nm, and the ratio of Volume average particle diameter MV/Number average particle diameter MN that is an index of monodispersity was 1.65. Then, the pigment dispersion was purified in an ultrafiltration device (UHP-25K, trade name, manufactured by Advantec MFS, Inc., fractional molecular weight: 200,000) while the total liquid amount is held constant by addition of distilled water, and then, concentrated, to give an aqueous dispersion (comparative sample 1) at a pigment concentration of 7.4 mass %. Analysis of the particle diameter after the concentrated dispersion was diluted to 1 mass % showed that the volume-average diameter MV of the fine particles contained was 35.8 nm and the ratio of Volume average particle diameter MV/Number average particle diameter MN that is an index of monodispersity was 1.95.

Example 2

A stirrer was placed in a 50 mL beaker, and 25.0 mL of the Liquid IIA (just distilled water) of Example 1 was stirred at room temperature. Then, 0.5 mL of the Liquid IA prepared in Example 1 was poured to the Liquid IIA with a syringe to obtain a dispersion of 2,9-dimethylquinacridone (PR122). The pH of the dispersion was about 13.0. The volume average particle diameter MV of the pigment dispersion was 46.5 nm, and the ratio of Volume average particle diameter MV/Number average particle diameter MN that is an index of monodispersity was 1.50. Then, purification and concentration was conducted in the same manner as the Example 1, so that 7.4 mass % of a pigment dispersion 2 (sample 2) of the present invention was obtained. Analysis of the particle diameter after the concentrated dispersion was diluted to 1 mass % showed that the volume-average diameter MV of the fine particles contained was 50.5 nm and the ratio of Volume average particle diameter MV/Number average particle diameter MN that is an index of monodispersity was 1.60.

Comparative Example 2

A stirrer was placed in a 50 mL beaker, and 25.0 mL of the Liquid IIB prepared in Comparative Example 1 was stirred at room temperature. Then, 0.5 mL of the Liquid IB prepared in Comparative Example 1 was poured to the Liquid IIB with a syringe to obtain a dispersion of 2,9-dimethylquinacridone (PR122). The pH of the dispersion was about 13.0. The volume average particle diameter MV of the pigment dispersion was 48.5 nm, and the ratio of Volume average particle diameter MV/Number average particle diameter MN that is an index of monodispersity was 1.78. Then, purification and concentration was conducted in the same manner as the Example 2, so that 7.0 mass % of a comparative pigment dispersion 2 (comparative sample 2) was obtained. Analysis of the particle diameter after the concentrated dispersion was diluted to 1 mass % showed that the volume-average diameter MV of the fine particles contained was 80.5 nm and the ratio of Volume average particle diameter MV/Number average particle diameter MN that is an index of monodispersity was 1.95.

Example 3

First, 0.6 g of Pigment Red 254 (CROMOPHTAL RED 2030, manufactured by Ciba Specialty Chemicals company, trade name) was dissolved at room temperature in 5.50 mL of dimethylsulfoxide, 0.63 mL of an aqueous solution of 8 mol/L KOH (manufactured by Wako Pure Chemical Industries, Ltd.), and 0.6 g of Exemplified compound (9) as an anionic surfactant, to prepare Liquid IC. The pH of the Liquid IC exceeded a measuring limit (pH 14), and was not able to be measured. Distilled water was designated as Liquid IIC. They were allowed to pass through a micro-filter of 0.45 µm (manufactured by Sartorius Co.), to remove impurities such as dust. Then, the reaction was effected in the following procedure, using a reactor in FIG. 2-1. Two Teflon (Registered Trademark) tubes having a length of 50 cm and an equivalent diameter of 1 mm were connected to two inlets of a Teflon (Registered Trademark) Y-shaped connector (manufactured by Tokyo Rika Kikai Corporation) having an equivalent diameter of 500 µm, using a connector. At ends of the tubes, syringes respectively containing the Liquids IC and IIC were connected and set at a pump. At an outlet of the connector, a Teflon (Registered Trademark) tube having a length of 1.5 m and an equivalent diameter of 500 µm was connected. The Liquid IC was sent out at a solution sending speed of 96 mL/h, and the Liquid IIC was sent out at a solution sending speed of 600 mL/h (Reynolds number: about 500). A dispersion of Pigment Red 254 was collected from the tip end of the outlet of the tube, and the pH of the thus-collected dispersion was about 12.6. The volume average particle diameter MV of the fine particles contained in the dispersion was 39.5 nm, and the ratio of Volume average particle diameter MV/Number average particle diameter MN that is an index of monodispersity was 1.40. Then, the pigment dispersion was purified in an ultrafiltration device (UHP-25K, trade name, manufactured by Advantec MFS, Inc., fractional molecular weight: 200, 000) while the total liquid amount is held constant by addition of distilled water, and then, concentrated, to give an aqueous dispersion (sample 3) at a pigment concentration of 8.2 mass %. Analysis of the particle diameter after the concentrated dispersion was diluted to 1 mass % showed that the volume-average diameter MV of the fine particles contained was 41.5 nm and the ratio of Volume average particle diameter MV/Number average particle diameter MN that is an index of monodispersity was 1.45.

Comparative Example 3

First, 0.6 g of Pigment Red 254 (CROMOPHTAL RED 2030, manufactured by Ciba Specialty Chemicals company, trade name) was dissolved at room temperature in 5.50 mL of dimethylsulfoxide, 0.63 mL of an aqueous solution of 8 mol/L KOH (manufactured by Wako Pure Chemical Industries, Ltd.), and 0.06 g of sodium N-oleoyl-N-methyltaurine salt as an anionic surfactant, to prepare Liquid ID. The pH of the Liquid ID exceeded a measuring limit (pH 14), and was not able to be measured. 0.06 g of sodium N-oleoyl-N-methyltaurine salt is a limit amount which it is not deposited and can be dissolved. A sodium N-oleoyl-N-methyltaurine salt was dissolved in a distilled water to prepared 0.1 mass % aqueous solutions, it was designated as Liquid IID. They were allowed to pass through a micro-filter of 0.45 µm (manufactured by Sartorius Co.), to remove impurities such as dust. Then, dispersion was prepared in the same manner as that of the Example 3, except that the Liquid IC and IIC was altered the Liquid ID and IID. The volume average particle diameter MV of the prepared dispersion (the pH was about 12.4) was 41.5 nm, and the ratio of Volume average particle diameter MV/Number average particle diameter MN that is an index of monodispersity was 1.55. Then, the pigment dispersion was purified and concentrated in an ultrafiltration device (UHP-25K, trade name, manufactured by Advantec MFS, Inc., fractional molecular weight: 200,000) while the total liquid amount is held constant by addition of distilled water, to give an aqueous dispersion (comparative sample 3) at a pigment concentration of 8.0 mass %. Analysis of the particle diameter after the concentrated dispersion was diluted to 1 mass % showed that the volume-average diameter MV of the fine particles contained was 60.5 nm and the ratio of Volume average particle diameter MV/Number average particle diameter MN that is an index of monodispersity was 1.96.

Example 4

3.0 g of Pigment Yellow 128 (CROMOPHTAL YELLOW 8GNP, manufactured by Ciba Specialty Chemicals company) was mixed and dissolved homogeneously at room temperature, with 45.5 mL of dimethylsulfoxide, 2.49 mL of methanol solution (manufactured by Wako Pure Chemical Industries, Ltd.) of 28% sodium methoxide, 2.4 g of 1:1 mixture of Exemplified compound (1) and (2), 0.6 g of N-vinylpyrolidone (manufactured by Wako Pure Chemical Industries, Ltd.), 0.15 g of polyvinylpyrolidone K30 (manufactured by Tokyo Kasei Kogyo Co., Ltd.), and 1.5 g of VPE0201 (manufactured by Wako Pure Chemical Industries, Ltd.), to prepare Liquid IE. The pH of the Liquid IE exceeded the measuring limit (pH 14), and was not able to be measured. Distilled water was designated as Liquid IIE. They were allowed to pass through a micro-filter of 0.45 µm (manufactured by Sartorius Co.), to remove impurities such as dust.

As the microreactor, a three-dimensional microreactor as shown in FIG. 1 having the following division number (number of flow paths) and the like was used.

(i) Number of supply flow paths (n) . . . divided into 5 with respect to each of two kinds of reaction solutions (10 flow paths in total are combined. In the microreactor shown in FIG. 2, eight flow paths in total (four each) are combined.)

| | | |
|---|---|---|
| (ii) | Width (W) of the supply flow paths 91, 92 | 400 µm each |
| (iii) | Depth (H) of the supply flow paths 91, 92 | 400 µm each |
| (iv) | Diameter (D) of the combination region 90 | 800 µm |
| (v) | Diameter (R) of the micro-flow path 93 | 800 µm |
| (vi) | Cross angle of center axes of the respective supply flow paths 91, 92 and the micro-flow path 93 in the combination region 90 | 90° |
| (vii) | Material for the microreactor | Stainless steel (SUS 304) |
| (viii) | Flow path processing method | Micro-discharge | processing method was performed, and three parts of the supply block 81, the combination block 82, and the reaction block 83 were sealed with a metal surface seal by mirror grinding. Two Teflon (Registered Trademark) tubes having a length of 50 cm and an equivalent diameter of 1 mm were connected to two inlets with a connector, and syringes respectively containing the IE and IIE solutions were connected to the ends of the inlets and set at a pump. A Teflon (Registered Trademark) tube having a length of 1.5 m and an equivalent diameter of 2 mm was connected to an outlet of the connector. The IE solution was sent out at a solution sending speed of 150 mL/min, and the IIE solution was sent out at a solution sending speed of 600 mL/min. A dispersion of Pigment Yellow 128 (pH was about 11.0) was collected from the tip end of the outlet of the tube, and heated at 80° C. for 5 hours. Analysis of the particle diameter showed that the volume-average diameter MV was 25.5 nm and the ratio of Volume average particle diameter MV/Number average particle diameter MN that is an index of monodispersity was 1.35. Then, the pigment dispersion was purified and concentrated in an ultrafiltration device (UHP-62K, trade name, manufactured by Advantec MFS, Inc., fractional molecular weight: 50,000) while the total liquid amount is held constant by addition of distilled water, to give an aqueous dispersion (sample 4) at a pigment concentration of 10.2 mass %. Analysis of the particle diameter after the concentrated dispersion was diluted to 1 mass % showed that the volume-average diameter MV of the fine particles contained was 26.0 nm and the ratio of Volume average particle diameter MV/Number average particle diameter MN that is an index of monodispersity was 1.36.

Comparative Example 4

3.0 g of Pigment Yellow 128 (CROMOPHTAL YELLOW 8GNP, manufactured by Ciba Specialty Chemicals company) was mixed and dissolved homogeneously at room temperature, with 45.5 mL of dimethylsulfoxide, 2.49 mL of methanol solution (manufactured by Wako Pure Chemical Industries, Ltd.) of 28% sodium methoxide, 2.4 g, 0.6 g of N-vinylpyrolidone (manufactured by Wako Pure Chemical Industries, Ltd.), 0.15 g of polyvinylpyrolidone K30 (manufactured by Tokyo Kasei Kogyo Co., Ltd.), and 1.5 g of VPE0201 (manufactured by Wako Pure Chemical Industries, Ltd.), to prepare Liquid IF. The pH of the Liquid IF exceeded the measuring limit (pH 14), and was not able to be measured. A sodium N-oleoyl-N-methyltaurine salt was dissolved in a distilled water to prepared 0.1 mass % aqueous solutions, it was designated as Liquid IIF. Then, synthesis and polymerization process of dispersion was conducted in the same manner as that of the Example 4, except that the Liquid IE and IIE was altered the Liquid IF and IIF. The volume average particle diameter MV of the prepared dispersion (the pH was about 10.8) was 30.1 nm, and the ratio of Volume average particle diameter MV/Number average particle diameter MN that is an index of monodispersity was 1.46. Then, the dispersion was purified and concentrated in an ultrafiltration device (UHP-62K, trade name, manufactured by Advantec MFS, Inc., fractional molecular weight: 50,000) while the total liquid amount is held constant by addition of distilled water, to give an aqueous dispersion (comparative sample 4) at a pigment concentration of 10.0 mass %. Analysis of the particle diameter after the concentrated dispersion was diluted to 1 mass % showed that the volume-average diameter MV of the fine particles contained was 50.0 nm and the ratio of Volume average particle diameter MV/Number average particle diameter MN that is an index of monodispersity was 1.86.

Example 5

The sample 4 obtained in Example 4 was further concentrated by using a flat ultrafiltration membrane. Specifically, the sample was concentrated to a pigment concentration of 23.5 mass % by using Agitation Ultraholder manufactured by Advantech equipped with Ultrafilter Q0500 (fractional molecular weight: 50,000) manufactured by Advantech. The dispersion obtained (sample 5) was significantly viscous, but remained transparent. Analysis of the particle diameter in the concentrated dispersion obtained after dilution to 1 mass % showed that the volume-average diameter MV of the fine particles contained was 26.5 nm and the volume-average diameter MV/number-average diameter MN ratio, an indicator of monodispersion, was 1.37.

Comparative Example 5

The Exemplified compound (I) in an amount equivalent to the mass of the Pigment Yellow 128 used in Example 4 and distilled water were added, and the mixture was agitated by ultrasonic dispersion (breakdown method), to give a pigment aqueous dispersion (comparative sample 5). The concentration was adjusted to 25.0 mass %. Analysis of the particle diameter after the concentrated dispersion was diluted to 1 mass % showed that the volume-average diameter MV of the fine particles contained was 110.6 nm and the volume-average diameter MV/number-average diameter MN ratio, an indicator of monodispersion, was 2.20.

Example 6

80 g of Pigment Yellow 128 (CROMOPHTAL YELLOW 8GNP, trade name, manufactured by Ciba Specialty Chemicals), 63 g of 28% sodium methoxide methanol solution (manufactured by Wako Pure Chemical Industries), 64 g of the Exemplified compound (I), 20 g of polyvinylpyrolidone K30 (product name, manufactured by Tokyo Kasei Kogyo Co., Ltd.) were dissolved in 1200 mL of dimethylsulfoxide at room temperature, to give a liquid IF. Distilled water was used as liquid IIF. The microreactor device used was a spatial microreactor device shown in FIG. 1, which is the same as that in Example 4. Two Teflon (registered trade name) tubes having a length of 50 cm and an equivalent diameter of 1 mm were connected to two inlets, and syringes respectively containing the liquid IE and the liquid IIE were connected thereto, and pumps were also connected thereto. A Teflon (registered trade name) tube having a length of 10 m and an equivalent diameter of 8 mm was connected to the connector outlet.

The liquid IF was supplied at a flow velocity of 40 mL/min and the liquid IIF at 160 mL/min, while a region of 6 m length (1 m to 7 m from outlet) of the Teflon (registered trade name) tube connected to the connector outlet was immersed in an oil bath kept at a temperature of 90° C. A dispersion of Pigment Yellow 128, which was eluted out of the tube outlet terminal, was collected. The volume-average diameter MV of the pigment particles in the liquid was 18.0 nm, and the volume-average diameter MV/number-average diameter MN ratio, an indicator of monodispersion, was 1.35.

The liquid was purified in an ultrafiltration device (UHP-62K, trade name, manufactured by Advantec MFS, Inc., fractional molecular weight: 50,000) while the total liquid amount is held constant by addition of distilled water, and then, concentrated, to give an aqueous dispersion at a pigment concentration of 9.0 mass %. Analysis of the particle diameter after the concentrated dispersion was diluted to 1 mass % showed that the volume-average diameter MV of the fine particles contained was 18.5 nm and the volume-average diameter MV/number-average diameter MN ratio, an indicator of monodispersion, was 1.36.

Comparative Example 6

A liquid IG (1340 ml) was prepared in a similar manner to Example 6, except that the Exemplified compound (I) was eliminated from the liquid IF. 64 g of N-oleoyl-N-methyltaurine sodium salt was dissolved in distilled water, to give 5360 ml of IIG liquid. A dispersion of Pigment Yellow 128 was prepared in a similar manner to Example 6, except that the liquids IF and IIF were replaced with these liquids. The volume-average diameter MV of the pigment particle in the liquid was 40.0 nm, and the volume-average diameter MV/number-average diameter MN ratio, an indicator of monodispersion, was 1.70. The liquid was concentrated in a similar manner to Example 6, to give a dispersion at a concentration of 10.5 mass %. Analysis of the particle diameter after the concentrated dispersion was diluted to 1 mass % showed that the volume-average diameter MV of the fine particles contained was 61.2 nm and the volume-average diameter MV/number-average diameter MN ratio, an indicator of monodispersion, was 2.02.

Measurement of the Haze of Aqueous Dispersion

The haze of samples 1 to 6, the aqueous dispersions according to the present invention, and comparative samples 1 to 6, comparative aqueous dispersions, was determined by enclosing the dispersion in a special transparent glass (preferably quartz glass) cell having an optical path length of 0.2 mm and analyzing the cell with an integrating-sphere photoelectric photometer (NDH2000, trade name, manufactured by Nippon Denshoku Co. Ltd.). The results are summarized in Table 1. The results show that the samples according to the present invention have low haze and are superior in dispersion stability and resistant to aggregation of the pigment fine-particles even at higher concentration.

Measurement of the Haze of Film Sample

A film was prepared by using each of the samples 1 to 6, aqueous dispersions according to the present invention, and the comparative samples 1 to 6, comparative aqueous dispersions, by the following operations 1 to 4.

1. The organic-pigment aqueous dispersion is adjusted to a concentration of 5 mass % by addition of distilled water (dispersion A).
2. Polyvinylalcohol (Kuraray Poval PVA205, trade name) was added to the dispersion A at a mass ratio of 10%, and the mixture was agitated thoroughly (dispersion B).
3. The dispersion B was coated on a transparent glass to a film thickness of 20±2 μm with a bar coater.
4. The coated film was dried at 50° C. for 3 hours.

Analysis of the haze of the film samples obtained revealed that film samples prepared from the samples according to the present invention had a haze smaller than that of the comparative samples (Table 1). Visual observation also showed distinct difference in transparency. The results indicate that the aqueous dispersion according to the present invention is superior in dispersion stability and retains its transparency without aggregation of the pigment fine-particles even when it is converted into the film state.

TABLE 1

| | | Volume average diameter (MV) (nm)*⁾ Monodispersity (MV/MN) | | | | |
| --- | --- | --- | --- | --- | --- | --- |
| | | | | Concentration after | Haze (Th) (%)**⁾ | |
| | | Before | After | concentration | | |
| | No. | concentration | concentration | (mass %) | Dispersion | Film |
| This invention | Sample 1 (PR122) | 19.5 1.40 | 20.8 1.45 | 7.5 | 2.0 | 1.1 |
| | Sample 2 (PR122) | 46.5 1.50 | 50.5 1.60 | 7.4 | 5.5 | 3.5 |
| | Sample 3 (PR254) | 39.5 1.40 | 41.5 1.45 | 8.2 | 3.0 | 2.0 |
| | Sample 4 (PY128) | 25.5 1.35 | 26.0 1.36 | 10.2 | 1.3 | 1.0 |
| | Sample 5 (PY128) | 26.0 1.36 | 26.5 1.37 | 23.5 | 2.5 | 1.2 |
| | Sample 6 (PY128) | 18.0 1.35 | 18.5 1.36 | 6.0 | 0.5 | 0.5 |
| Comparative example | Sample for comparison 1 (PR122) | 20.5 1.65 | 35.8 1.95 | 7.4 | 11.5 | 5.6 |
| | Sample for comparison 2 (PR122) | 48.5 1.78 | 80.5 1.95 | 7.0 | 12.0 | 6.0 |
| | Sample for comparison 3 (PR254) | 41.5 1.55 | 60.5 1.96 | 8.0 | 12.5 | 6.5 |
| | Sample for comparison 4 (PY128) | 30.1 1.46 | 50.0 1.85 | 10.0 | 13.5 | 7.0 |
| | Sample for comparison 5 (PY128) | | 110.6 2.20 | 25.0 | 30.5 | 10.2 |
| | Sample for comparison 6 (PY128) | 40.0 1.70 | 61.2 2.02 | 10.5 | 15.7 | 8.7 |

(Note)
*⁾The particle diameters (MV and MN) before concentration were determined by using the reaction product solution as it was. Those after concentration were determined after diluting the sample with distilled water to a concentration of 1 mass %.
**⁾The haze of the dispersion was determined without adjustment of concentration, by enclosing the concentrated solution as it was in a 0.2-mm cell. The haze of film was determined by examining a film obtained by preparing a coating solution by diluting the concentrated solution to 5 mass % and applying the coating solution.

Further, the films of samples 1 to 3 were brilliant clear red, and those of samples 4 to 6 were brilliant clear yellow. All films above were superior in color depth and chromaticity, and the coated films were highly brilliant. Further, all dispersion samples contained water as the main solvent and were thus environmentally friendly.

Example 7

0.97 g of tetraethyl orthotitanate, 0.85 g of acetylacetone, and 18.89 g of ethanol were mixed at room temperature for 10 minutes under agitation, and after addition of distilled water, the mixture was agitated additionally for 1 hour, to give a catalyst liquid. Then, 4.41 g of distilled water, 0.17 g of polyvinylalcohol (Kuraray PVA205, trade name), 1.01 g of the catalyst liquid, and 0.52 g of tetramethylorthosilane were mixed at room temperature for 2 hours under agitation. Then, the mixture was left overnight in a refrigerator, to give a sol gel liquid. Four g of each of the dispersion samples 1 to 6, organic pigment fine-particle dispersions, previously adjusted to a concentration of 5 mass % with distilled water, was added to the sol gel liquid, to give a colored coating composition of sample 7 to 12. Each of these coating compositions was spin-coated on a glass plate (1.0±0.1 mm) at a velocity of 1,000 rpm. The coated film obtained was left for 20 seconds at room temperature and dried under heat at 100° C. for 10 minutes, to give a film sample 7 to 12 having a film thickness of 305 nm.

Comparative Example 7

Comparative film samples 7 to 12 were obtained similarly, except that the organic-pigment aqueous dispersion was replaced from the samples 1 to 6 respectively to the comparative samples 1 to 6. In any case, the film thickness was kept constant at 300±10 nm.

The results of the haze measurement of the samples thus obtained are summarized in Table 2. The haze was determined by using an integral spherical photoelectric photometer, NDH2000 manufactured by Nippon Denshoku Co. Ltd. The results indicate that the colored coating composition obtained by using the organic-pigment aqueous dispersion according to the present invention gives a colored film distinctively lower in haze and superior in transparency.

The films of samples 7 to 9 were brilliant clear red, and those of samples 10 to 12 were brilliant clear yellow. Further, all dispersion samples contained water as the main solvent and were thus environmentally friendly.

TABLE 2

| | No. | Sample No. of organic pigment aqueous dispersion | Haze of colored glass (Th (%)) (film thickness 300 ± 10 nm, glass thickness 1.0 ± 0.1 mm) |
|---|---|---|---|
| This invention | Sample 7 (PR122) | Sample 1 | 0.03 |
| | Sample 8 (PR122) | Sample 2 | 0.09 |
| | Sample 9 (PR254) | Sample 3 | 0.07 |
| | Sample 10 (PR128) | Sample 4 | 0.04 |
| | Sample 11 (PR128) | Sample 5 | 0.05 |
| | Sample 12 (PR128) | Sample 6 | 0.03 |

TABLE 2-continued

| | No. | Sample No. of organic pigment aqueous dispersion | Haze of colored glass (Th (%)) (film thickness 300 ± 10 nm, glass thickness 1.0 ± 0.1 mm) |
|---|---|---|---|
| Comparative example | Sample for comparison 7 (PR122) | Sample for comparison 1 | 0.30 |
| | Sample for comparison 8 (PR122) | Sample for comparison 2 | 0.32 |
| | Sample for comparison 9 (PR254) | Sample for comparison 3 | 0.35 |
| | Sample for comparison 10 (PR128) | Sample for comparison 4 | 0.40 |
| | Sample for comparison 11 (PR128) | Sample for comparison 5 | 1.05 |
| | Sample for comparison 12 (PR128) | Sample for comparison 6 | 0.55 |

Example 8

The microreactor device used was a spatial microreactor device shown in FIG. 1, which is the same as that in Example 6. Two Teflon (registered trade name) tubes having a length of 50 cm and an equivalent diameter of 1 mm were connected to two inlets, and syringes respectively containing the liquid IF and the liquid IIF (see Example 6) were connected thereto, and pumps were also connected thereto. A Teflon (registered trade name) tube having a length of 10 m and an equivalent diameter of 8 mm was connected to the connector outlet.

The liquid IF was supplied at a flow velocity of 40 mL/min and the liquid IIF at 160 mL/min, while a region of 6 m length (1 m to 7 m from outlet) of the Teflon (registered trade name) tube connected to the connector outlet was immersed in an oil bath kept at a temperature of 90° C. A dispersion of Pigment Yellow 128, which was eluted out of the tube outlet terminal, was collected, to give a sample 8a.

The liquid was purified in an ultrafiltration device (UHP-62K, trade name, manufactured by Advantec MFS, Inc., fractional molecular weight: 50,000) while the total liquid amount was held constant by addition of distilled water, and then, concentrated as much as possible. The highly viscous solution obtained was concentrated additionally by using a freeze dryer, to give a viscous aqueous dispersion at approximately 30 mass %.

Subsequently, samples 8b and 8c were prepared similarly, except that the surfactant used was changed from the Exemplified compound (I) to that shown in Table 3 in the same amount. Further, samples 8d, 8e and 8f were prepared similarly, except that the pigment was replaced with PR254 in the same molar amount and the surfactant with that shown in Table 3 in the same amount.

Each of these samples was purified and concentrated as much as possible by using the ultrafiltration device (UHP-25K, manufactured by Advantec MFS, Inc., fractional molecular weight: 200,000) described in Example 1, to give a highly viscous solution, which was further concentrated in a freeze dryer. The viscous high-concentration sample obtained was fed into a separable cell having a thickness of 0.2 mm, and the haze thereof was determined while the cell was capped with a glass stopper. The results are summarized in Table 3.

Comparative Example 8

Liquid IG (1,340 ml) was prepared similarly to Example 6, except that the Exemplified compound (I) was eliminated from the liquid IF. 64 g of N-oleoyl-N-methyltaurine sodium salt was dissolved in distilled water, to give 5,360 ml of liquid IIG. A dispersion of Pigment Yellow 128 was prepared similarly to Example 6, except that the liquids IF and IIF were replaced with these liquids. The dispersion was designated as comparative sample 8a.

Then, a comparative sample 8b was prepared similarly to comparative sample 8a, except that N-oleoyl-N-methyltaurine sodium salt was replaced with potassium oleate in the same amount. Further, a comparative sample 8c was prepared in a similar manner to Comparative Example 8a, except that the pigment was replaced with PR254 in the same molar amount and the N-oleoyl-N-methyltaurine sodium salt with 7-ethyl-2-methylundecan-4-ylsulfonic monoester sodium salt in the same amount. These comparative samples were concentrated in a manner similar to the method described in Example 8, and the haze thereof was determined. The results are summarized in Table 3.

As obvious from the results in Table 3, the haze of the high-concentration samples obtained from the samples according to the present invention is lower than that of the comparative samples and that the samples according to the present invention retain high transparency even at higher concentration.

outlet was collected; and an aqueous solution of 19.8 g of polyvinylpyrolidone K30 dissolved in 200 ml of water was added to the liquid; and the mixture was heated under nitrogen atmosphere at 70° C. for 2 hours. The liquid was purified and concentrated in an ultrafiltration device, while the total liquid amount is held constant by addition of distilled water, and the concentration was adjusted to 10.0 mass %.

The volume average particle diameter MV of the pigment particles in the liquid was 28.7 nm, and the piece number-average particle diameter MN was 21.1 nm. D90, D50, and D10 were respectively 29.1 nm, 19.2 nm, and 15.2 nm. (90 number % in the entire pigment particles is D90; 50 number %, D50; and 10 number %, D10). (The particle diameter of pigment particles was determined by using Nan track UPA-O150 manufactured by Nikkiso Co., Ltd., as the liquid was diluted with distilled water to a pigment concentration of 0.2 mass % at room temperature).

Example 10

72 g of 2,9-dimethylquinacridone, 57.5 g of Aqualon KH-10, 14.4 g of polyvinylpyrolidone K15, 163 g of 28% sodium-methoxide methanol solution, and 300 mL of methanol were dissolved in 1.5 L of dimethylsulfoxide at room temperature. The solution was filtered through a 0.45-μm microfilter (manufactured by Sartorius) for removal of foreign particles and other impurities, to give liquid I. Distilled water was used as liquid II.

TABLE 3

| | No. | Kind of pigment | Surfactant | Concentrated concentration (mass %) | Haze (Th) (%) |
|---|---|---|---|---|---|
| This invention | Sample 8a | PY128 | Exemplified compound (1) | 20.5 | 4.2 |
| | Sample 8b | PY128 | Exemplified compound (2) | 25.5 | 4.8 |
| | Sample 8c | PY128 | Exemplified compound (4) | 25.5 | 5.2 |
| | Sample 8d | PR254 | Exemplified compound (8) | 30.0 | 6.8 |
| | Sample 8e | PR254 | Exemplified compound (10) | 28.5 | 6.3 |
| | Sample 8f | PR254 | Exemplified compound (12) | 23.5 | 4.4 |
| Comparative example | Sample for comparison 8a | PY128 | N-oleoyl-N-methyltaurine sodium salt | 28.6 | 54.6 |
| | Sample for comparison 8b | PY128 | Potassium oleate | 25.5 | 77.5 |
| | Sample for comparison 8c | PR254 | 7-ethyl-2-methylundecan-4-yl-sulfonate monoester sodium salt | 27.7 | 60.5 |

Example 9

132 G of Pigment Yellow 128, 105.6 G of Aqualon KH-10, 13.2 G of polyvinylpyrolidone K30, and 103.5 G of 28% sodium methoxide methanol solution were dissolved in 2.18 L of dimethylsulfoxide at room temperature. The solution was filtered through a 0.45-μm microfilter (manufactured by Sartorius) for removal of foreign particles and other impurities, to give liquid I. Distilled water was used as liquid II.

The microreactor device used was the spatial microreactor device shown in FIG. 1 (two kinds of reaction solutions were divided respectively into three portions).

Liquids I and II were supplied at flow velocities of 40 mL/min and 160 mL/min from the two inlets of the microreactor; the Pigment Yellow 128 dispersion obtained from the The microreactor device used was the spatial microreactor device shown in FIG. 1 (two kinds of reaction solutions were divided respectively into three portions).

Liquids I and II were supplied at flow velocities of 40 mL/min and 160 mL/min from the two inlets of the microreactor; the dispersion obtained from the outlet was collected; and an aqueous solution of 14.4 g of polyvinylpyrolidone K15 dissolved in 140 ml of water was added to the liquid; and the mixture was heated under nitrogen atmosphere at 70° C. for 2 hours. The liquid was purified and concentrated in an ultrafiltration device, while the total liquid amount is held constant by addition of distilled water, and the concentration was adjusted to 10.0 mass %.

The volume average particle diameter MV of the pigment particles in the liquid was 24.8 nm, and the piece number-average particle diameter MN was 17.9 nm. D90, D50, and D10 were respectively 25.1 nm, 16.2 nm, and 12.9 nm. (90 number % in the entire pigment particles is D90; 50 number %, D50; and 10 number %, D10). (The particle diameter of pigment particle was determined by using Nan track UPA-O150 manufactured by Nikkiso Co., Ltd., as the liquid was diluted with distilled water to a pigment concentration of 0.2 mass % at room temperature).

Example 11

15.5 g of pigment red 254 (CROMOPHTALRED 2030, manufactured by Ciba Specialty Chemicals), 12.4 g of Aqualon KH-10, 3.1 g of polyvinylpyrolidone K15, and 11.2 g of 28% sodium methoxide methanol solution were dissolved in 670 mL of dimethylsulfoxide at room temperature. The solution was filtered through a 0.45-μm microfilter (manufactured by Sartorius) for removal of foreign particles and other impurities, to give liquid I. Distilled water was used as liquid II.

The microreactor device used was the spatial microreactor device shown in FIG. 1 (two kinds of reaction solutions were divided respectively into three portions).

Liquids I and II were supplied at flow velocities of 40 mL/min and 160 mL/min from the two inlets of the microreactor; the dispersion obtained from the outlet was collected; and the mixture was heated under nitrogen atmosphere at 70° C. for 2 hours. The liquid was purified and concentrated in an ultrafiltration device, while the total liquid amount is held constant by addition of distilled water, and the concentration was adjusted to 10.0 mass %.

The volume average particle diameter MV of the pigment particles in the liquid was 14.5 nm, and the piece number-average particle diameter MN was 11.9 nm. D90, D50, and D10 were respectively 13.8 nm, 8.9 nm, and 7.1 nm. (90 number % in the entire pigment particles is D90; 50 number %, D50; and 10 number %, D10). (The particle diameter of pigment particle was determined by using Nan track UPA-O150 manufactured by Nikkiso Co., Ltd., as the liquid was diluted with distilled water to a pigment concentration of 0.2 mass % at room temperature).

Having described our invention as related to the present embodiments, it is our intention that the invention not be limited by any of the details of the description, unless otherwise specified, but rather be construed broadly within its spirit and scope as set out in the accompanying claims.

This nonprovisional application claims priority under 35 U.S.C. §119 (a) on Patent Application No. 2007-103981 filed in Japan on Apr. 11, 2007, which is herein incorporated by reference.

What we claim is:

1. An organic-pigment aqueous dispersion, comprising a pigment at a concentration of 6 to 30 mass %, and having a haze of 0.3 to 10%, as determined by enclosing the dispersion in a transparent glass cell of optical distance 0.2 mm and analyzing with integrating-sphere photoelectric photometry, wherein the aqueous dispersion contains at least one anionic surfactant that has a solubility of 5 mass % or more in an aprotic polar solvent, the at least one anionic surfactant being represented by formula (I), having a molecular weight of 400 to 2,000

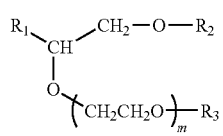

Formula (I)

wherein $R_1$ represents an alkyl group having 5 to 20 carbon atoms; $R_2$ represents an alkyl, alkenyl, or alkynyl group having 3 to 10 carbon atoms; $R_3$ represents —$SO_3M$ or —$(CH_2)_n$—COOM, in which M represents a sodium, potassium, or ammonium ion; and n is 1 or 2; and m is an integer of 1 to 20.

2. The organic-pigment aqueous dispersion as claimed in claim 1, wherein a volume-average diameter (MV) of the organic pigment contained in the aqueous dispersion is 3 to 80 nm, and the ratio of volume-average diameter (MV)/number-average diameter (MN) is 1.2 to 1.80.

3. The organic-pigment aqueous dispersion as claimed in claim 1, wherein the aprotic solvent is dimethylsulfoxide (DMSO).

4. The organic-pigment aqueous dispersion as claimed in claim 1, which is prepared by a pH-changing coprecipitation method.

5. The organic-pigment aqueous dispersion as claimed in claim 4, wherein the pH-changing coprecipitation method is carried out in the course of flow in a channel.

6. The organic-pigment aqueous dispersion as claimed in claim 5, wherein the channel in the pH-changing coprecipitation method is a micro space.

7. The organic-pigment aqueous dispersion as claimed in claim 1, wherein a value, as determined by: forming a film with the aqueous dispersion by the following operations 1 to 4, and measuring a haze of the film with integrating-sphere photoelectric photometry, is 0.5 to 5%:

1. adjusting the organic-pigment aqueous dispersion with distilled water to a concentration of 5 mass %, to give a dispersion A;
2. adding polyvinyl alcohol (Kuraray Poval PVA205, trade name) to the dispersion A at a mass ratio of 10% to give a mixture thereof, and agitating the mixture thoroughly, to give a dispersion B;
3. applying the dispersion B on a transparent glass with a bar coater, to give a film of thickness 20±2 μm; and
4. drying the film at 50° C. for 3 hours.

8. The organic-pigment aqueous dispersion as claimed in claim 1, wherein the dispersion is purified and concentrated with an ultrafiltration membrane.

9. A method of producing an organic-pigment aqueous dispersion, comprising: diluting the organic-pigment aqueous dispersion as claimed in claim 1, to a pigment concentration of lower than 10 mass %.

10. A colored coating composition, comprising the aqueous organic pigment fine-particle dispersion as claimed in claim 1 as a coloring component, and comprising at least one inorganic oxide as a matrix component.

11. The colored coating composition as claimed in claim 10, wherein, when a film of dry film thickness 300±10 nm is formed on a glass plate of thickness 1.0±0.1 mm by spin coating of the colored coating composition, a haze of the film is 0.03 to 0.1%.

12. The colored coating composition as claimed in claim 10, wherein the inorganic oxide is a metal alkoxide and/or a metal-alkoxide hydrolytic condensate.

13. The colored coating composition as claimed in claim 10, wherein the colored coating composition contains a solvent which contains water as a major component.

14. A coated article, which is prepared with the organic-pigment aqueous dispersion as claimed in claim 1.

* * * * *